US010343532B2

(12) United States Patent
Yuasa

(10) Patent No.: US 10,343,532 B2
(45) Date of Patent: Jul. 9, 2019

(54) VEHICLE AND NONCONTACT POWER TRANSMISSION AND RECEPTION SYSTEM

(71) Applicant: Toyota Jidosha Kabushiki Kaisha, Toyota-shi Aichi-ken (JP)

(72) Inventor: Hiroaki Yuasa, Miyoshi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 107 days.

(21) Appl. No.: 15/793,518

(22) Filed: Oct. 25, 2017

(65) Prior Publication Data
US 2018/0170192 A1 Jun. 21, 2018

(30) Foreign Application Priority Data

Dec. 21, 2016 (JP) ................. 2016-247827

(51) Int. Cl.
*H02J 7/00* (2006.01)
*H02J 50/12* (2016.01)
*B60L 11/00* (2006.01)
*B60L 50/12* (2019.01)
*B60L 53/20* (2019.01)
*B60L 53/38* (2019.01)
*B60L 53/12* (2019.01)
(Continued)

(52) U.S. Cl.
CPC ............ *B60L 11/1811* (2013.01); *B60K 1/04* (2013.01); *B60L 53/12* (2019.02); *B60L 53/20* (2019.02);
(Continued)

(58) Field of Classification Search
CPC ....... H02J 50/12; H02J 7/025; B60L 11/1811; B60L 50/12; B60L 53/20; B60L 53/38;
(Continued)

(56) References Cited

U.S. PATENT DOCUMENTS 9,950,636 B2 * 4/2018 Saito ..................... B60L 11/182
2007/0290814 A1 * 12/2007 Yoshida ............. A61B 1/00029
340/10.34
(Continued)

FOREIGN PATENT DOCUMENTS

JP 2012188116 A 10/2012
JP 2013-110822 A 6/2013
(Continued)

OTHER PUBLICATIONS

Dizaji, "Design of Distributed Wireless Power Transmission System", Department of Electrical and Computer Engineering of University of Alberta, 2016, 107 pages. (Year: 2016).*

*Primary Examiner* — Phallaka Kik
(74) *Attorney, Agent, or Firm* — Dinsmore & Shohl LLP

(57) ABSTRACT

A vehicle capable of receiving an electric power in a contactless manner includes a vehicle body and a power reception apparatus. A first region made of aluminum or formed so that a magnetic permeability and an electric resistance thereof are lower than a magnetic permeability and an electric resistance of aluminum, respectively, is provided at a position on one side in a reference direction relative to the power reception apparatus. A space and/or a second region formed so that a magnetic permeability and an electric resistance thereof are higher than the magnetic permeability and the electric resistance of the first region, respectively, is provided at a position on the other side in the reference direction. A winding axis of a power receiving coil is placed at a position deviating toward the one side in the reference direction from a central position in a vehicle width direction.

4 Claims, 31 Drawing Sheets

(51) Int. Cl.
*B60K 1/04* (2019.01)
*B60L 11/18* (2006.01)
*H02J 7/02* (2016.01)

(52) U.S. Cl.
CPC ............ *B60L 53/38* (2019.02); *H02J 7/0042* (2013.01); *H02J 7/025* (2013.01); *H02J 50/12* (2016.02); *B60K 2001/0438* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01)

(58) Field of Classification Search
CPC ... B60L 53/12; B60K 1/04; B60K 2001/0438; Y02T 10/7005; Y02T 10/7072; Y02T 90/12; Y02T 90/121; Y02T 90/125; Y02T 90/127; Y02T 90/14
USPC .......................................... 320/109, 108, 104
See application file for complete search history.

(56) References Cited

U.S. PATENT DOCUMENTS

| | | |
|---|---|---|
| 2013/0037365 A1 | 2/2013 | Ichikawa |
| 2013/0127409 A1 | 5/2013 | Ichikawa |
| 2013/0193749 A1 | 8/2013 | Nakamura et al. |
| 2014/0305722 A1 | 10/2014 | Ichikawa et al. |
| 2015/0008877 A1 | 1/2015 | Ichikawa et al. |
| 2015/0332827 A1* | 11/2015 | Omori ..................... H01F 38/14 307/104 |
| 2015/0332847 A1* | 11/2015 | Omori ..................... H01F 38/14 307/104 |
| 2015/0364924 A1* | 12/2015 | Yuasa ..................... H01F 27/02 307/104 |
| 2016/0082848 A1* | 3/2016 | Ichikawa .............. B60L 53/305 701/22 |
| 2016/0089987 A1* | 3/2016 | Ichikawa .............. B60L 11/182 701/22 |
| 2016/0114687 A1* | 4/2016 | Ichikawa ................ B60L 5/005 701/22 |
| 2017/0033609 A1* | 2/2017 | Nakamura .............. H02J 5/005 |
| 2017/0169942 A1* | 6/2017 | Yuasa ..................... H01F 38/14 |
| 2017/0326993 A1* | 11/2017 | Yuasa ..................... B60L 53/12 |
| 2018/0212447 A1* | 7/2018 | Tabata .................... H02J 50/10 |

FOREIGN PATENT DOCUMENTS

| | | |
|---|---|---|
| JP | 2013-126327 A | 6/2013 |
| JP | 2013-146148 A | 7/2013 |
| JP | 2013-146154 A | 7/2013 |
| JP | 2013-154815 A | 8/2013 |
| JP | 2015047046 A * | 3/2015 |
| WO | 2013076870 A1 | 5/2013 |

* cited by examiner

VEHICLE AND NONCONTACT POWER
TRANSMISSION AND RECEPTION SYSTEM

CROSS-REFERENCE TO RELATED
APPLICATIONS

This application claims priority to Japanese Patent Application No. 2016-247827 filed on Dec. 21, 2016, which is incorporated herein by reference in its entirety including the specification, drawings and abstract.

BACKGROUND

1. Technical Field

This disclosure relates to a vehicle capable of receiving an electric power in a contactless manner from a power transmission apparatus provided outside a vehicle body, and a noncontact power transmission and reception system.

2. Description of Related Art

As described in Japanese Patent Application Publication No. 2012-188116 (JP 2012-188116 A), Japanese Patent Application Publication No. 2013-154815 (JP 2013-154815 A), Japanese Patent Application Publication No. 2013-146154 (JP 2013-146154 A), Japanese Patent Application Publication No. 2013-146148 (JP 2013-146148 A), Japanese Patent Application Publication No. 2013-110822 (JP 2013-110822 A), Japanese Patent Application Publication No. 2013-126327 (JP 2013-126327 A), and International Publication No. 2013/076870, a vehicle capable of receiving an electric power in a contactless manner from a power transmission apparatus provided outside a vehicle body has been developed. The vehicle as described in these documents is provided with a power reception apparatus on a bottom surface side of the vehicle body. When the power reception apparatus receives an electric power from a power transmission apparatus, the vehicle is placed so that the power reception apparatus is opposed to the power transmission apparatus in an up-down direction.

When the electric power is supplied to a power transmission coil of the power transmission apparatus, magnetic fluxes are formed around the power transmission coil. When the magnetic fluxes cross a power receiving coil, the vehicle can receive the electric power through the power reception apparatus. On the bottom surface side of the vehicle body, not only the power reception apparatus but also a metal member such as a muffler (e.g., a magnetic body such as iron or stainless) may be placed near the power reception apparatus (see international Publication No. 2013/076870).

SUMMARY

It is desirable that power transmission and reception be performed in a state where the power transmission coil and the power receiving coil are aligned to each other (e.g., in a state where respective extension lines of their winding axes accord with each other). However, it is also assumed that the vehicle stops in a state where the vehicle deviates from the power transmission apparatus, and because of that, the power transmission and reception is performed in a state where the power transmission coil and the power receiving coil are not aligned to each other.

As has been described at the beginning, a metal member may be placed near the power reception apparatus, for example, such that the metal member is adjacent to the power reception apparatus. In this case, the magnetic fluxes formed around the power transmission coil might cross not only the power receiving coil, but also the metal member. For example, assume that a member (a nonmagnetic material) made of aluminum is placed on a first direction side relative to the power reception apparatus, and an iron member is placed on a second direction side relative to the power reception apparatus, the second direction side being an opposite side to the first direction.

When the power transmission and reception is performed in a state where the power receiving coil deviates toward the first direction side (a side where the aluminum member is positioned) from the power transmission coil only by a specific distance, a first coupling coefficient is obtained. When the power transmission and reception is performed in a state where the power receiving coil deviates from the power transmission coil toward the second direction side (a side where the iron member is positioned) only by the same distance as the specific distance, a second coupling coefficient is obtained. The first coupling coefficient and the second coupling coefficient can be values different from each other.

That is, in a case where a metal member, such as iron or stainless, having a higher magnetic permeability and a higher electric resistance than aluminum is provided near the power reception apparatus, the magnetic fluxes easily pass through the metal member and the magnetic fluxes are guided by the metal member so as to easily reach the power receiving coil. In the meantime, in a case where aluminum or a metal member having a lower magnetic permeability and a lower electric resistance than aluminum is provided near the power reception apparatus, the magnetic fluxes are easily reflected by a surface of the metal member so that the magnetic fluxes can hardly reach the power receiving coil.

In a case where an aluminum member, for example, is placed on the first direction side relative to the power reception apparatus and an iron member, for example, is placed on the second direction side relative to the power reception apparatus, the second direction side being an opposite side to the first direction, a plurality of regions having different magnetic permeabilities and different electric resistances is formed around the power reception apparatus. In such a case, a difference easily occurs between a coupling coefficient obtained when the power receiving coil deviates from the power transmission coil toward the first direction side and a coupling coefficient obtained when the power receiving coil deviates from the power transmission coil toward the second direction side.

When the coupling coefficient varies depending on a positional deviation, a receiving voltage of the power reception apparatus varies accordingly. When the power transmission apparatus performs a constant power control, a current flowing through the power transmission apparatus also varies. This requires a device design that can permit variations in the coupling coefficient caused due to the positional deviation. For example, it is necessary to secure a large rating (withstand voltage range) of the power reception apparatus in advance, it is necessary to secure a large rating (withstand current range) of the power transmission apparatus in advance, it is necessary to secure a large coil linear shape to be used, in advance, and it is necessary to set a large current value to be supplied to the power transmission coil in advance.

This disclosure provides a vehicle and a noncontact power transmission and reception system, each of which is configured such that in a case where regions having different magnetic permeabilities and electric resistances are formed around a power reception apparatus, even if a power receiving coil deviates from a power transmission coil, a variation in a coupling coefficient between the power receiving coil and the power transmission coil is restrained.

A vehicle according to a first aspect of the present disclosure is a vehicle capable of receiving an electric power from a power transmission apparatus in a contactless manner, the power transmission apparatus being placed such that a winding axis of a power transmission coil extends in an up-down direction at a central position of a parking space in a width direction, and the vehicle includes: a vehicle body having a bottom surface; and a power reception apparatus including a power receiving coil configured to receive an electric power from the power transmission coil of the power transmission apparatus in a contactless manner, and a housing in which the power receiving coil is accommodated, the power reception apparatus being provided on a bottom surface side of the vehicle body so that a winding axis of the power receiving coil extends in the up-down direction. When a direction intersecting with the winding axis of the power receiving coil and parallel to a vehicle width direction is assumed a reference direction, a first region made of aluminum or formed so that a magnetic permeability and an electric resistance of the first region are lower than a magnetic permeability and an electric resistance of aluminum, respectively, is provided at a position on one side in the reference direction relative to the housing of the power reception apparatus. A space and/or a second region formed so that a magnetic permeability and an electric resistance of the second region are higher than the magnetic permeability and the electric resistance of the first region is provided at a position on the other side in the reference direction relative to the housing of the power reception apparatus. The winding axis of the power receiving coil is placed at a position deviating toward the one side in the reference direction relative to a central position of the vehicle body in the vehicle width direction.

In the above vehicle, magnetic fluxes formed around the power transmission coil pass near the first region positioned on the one side relative to the winding axis of the power receiving coil and cross the power receiving coil, or pass near the space and/or the second region positioned on the other side relative to the winding axis and cross the power receiving coil. On the first region side positioned on the one side, the magnetic fluxes are easily reflected by the first region in comparison with the space and the second region, and the magnetic fluxes can hardly reach the power receiving coil in comparison with the second region. On the space and/or the second region side positioned on the other side, the magnetic fluxes easily reach the power receiving coil in comparison with the first region.

When a state where the central position of the vehicle body in the vehicle width direction accords with the winding axis of the power transmission coil is assumed an aligned state, the winding axis of the power receiving coil is placed at a position deviating toward the one side from the central position of the vehicle body in the vehicle width direction in the above vehicle. Accordingly, even if noncontact power transmission and reception is performed in the aligned state, or even if noncontact power transmission and reception is performed in a state where the power receiving coil deviates from the power transmission coil in the vehicle width direction, an influence of the first region, positioned on the one side relative to the winding axis of the power receiving coil, with respect to the noncontact power transmission and reception hardly changes, and an influence of the space and/or the second region, positioned on the other side relative to the winding axis of the power receiving coil, with respect to the noncontact power transmission and reception also hardly changes. Accordingly, with the above vehicle, even if the power receiving coil deviates from the power transmission coil in the vehicle width direction, it is possible to restrain variations in a coupling coefficient between the power receiving coil and the power transmission coil.

The vehicle further includes a power storage apparatus including a body case, the body case being placed on the bottom surface of the vehicle body. The housing of the power reception apparatus may be attached to a bottom surface of the body case, and the bottom surface of the body case of the power storage apparatus may have a part constituting the first region. With the above configuration, in a case where the power storage apparatus is placed on the bottom surface side of the vehicle body, even if the power receiving coil deviates from the power transmission coil in the vehicle width direction, it is possible to restrain the variations in the coupling coefficient between the power receiving coil and the power transmission coil.

The vehicle further includes: an engine placed inside the vehicle body; and a muffler connected to the engine and provided on the bottom surface side of the vehicle body. The muffler may have a part constituting the second region. With the above configuration, in a case where the engine is provided and the muffler is placed on the bottom surface side of the vehicle body, even if the power receiving coil deviates from the power transmission coil in the vehicle width direction, it is possible to restrain the variations in the coupling coefficient between the power receiving coil and the power transmission coil.

A noncontact power transmission and reception system according to a second aspect of the present disclosure includes: a power transmission apparatus including a power transmission coil and placed such that a winding axis of the power transmission coil extends in an up-down direction in a parking space; and a vehicle capable of receiving an electric power from the power transmission apparatus in a contactless manner in a state where the vehicle is aligned in the parking space, the vehicle including a vehicle body having a bottom surface, and a power reception apparatus including a power receiving coil configured to receive an electric power from the power transmission coil of the power transmission apparatus in a contactless manner, and a housing in which the power receiving coil is accommodated, the power reception apparatus being provided on the bottom surface of the vehicle body so that a winding axis of the power receiving coil extends in the up-down direction. When a direction intersecting with the winding axis of the power receiving coil and parallel to a vehicle front-rear direction or a vehicle width direction is assumed a reference direction, a first region made of aluminum or formed so that a magnetic permeability and an electric resistance of the first region are lower than a magnetic permeability and an electric resistance of aluminum, respectively, may be provided at a position on one side in the reference direction relative to the housing of the power reception apparatus. A space and/or a second region formed so that a magnetic permeability and an electric resistance of the second region are higher than the magnetic permeability and the electric resistance of the first region, respectively, may be provided at a position on the other side in the reference direction relative to the housing of the power reception apparatus. When the winding axis of the power transmission coil is extended upward to draw a virtual extension line in a state where the vehicle body is aligned in the parking space, the winding axis of the power receiving coil may be placed at a position deviating toward the one side in the reference direction from a position of the extension line.

In the noncontact power transmission and reception system, when a state where a predetermined reference position provided in the vehicle body accords with the winding axis of the power transmission coil is assumed an aligned state, the winding axis of the power receiving coil is placed at a position deviating toward the one side in the reference direction from the reference position of the vehicle body. Accordingly, even if noncontact power transmission and reception is performed in the aligned state, or even if noncontact power transmission and reception is performed in a state where the power receiving coil deviates from the power transmission coil in the reference direction, an influence of the first region, positioned on the one side in the reference direction relative to the winding axis of the power receiving coil, with respect to the noncontact power transmission and reception hardly changes, and an influence of the space and/or the second region, positioned on the other side in the reference direction relative to the winding axis of the power receiving coil, with respect to the noncontact power transmission and reception also hardly changes. Accordingly, with the above vehicle, even if the power receiving coil deviates from the power transmission coil in the reference direction, it is possible to restrain variations in a coupling coefficient between the power receiving coil and the power transmission coil.

With the above configuration, in a case where regions having different magnetic permeabilities and electric resistances are formed around the power reception apparatus, even if the power receiving coil deviates from the power transmission coil, it is possible to restrain the coupling coefficient between the power receiving coil and the power transmission coil from varying, thereby making it possible to achieve noncontact charging efficiency with few variations with respect to a positional deviation.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
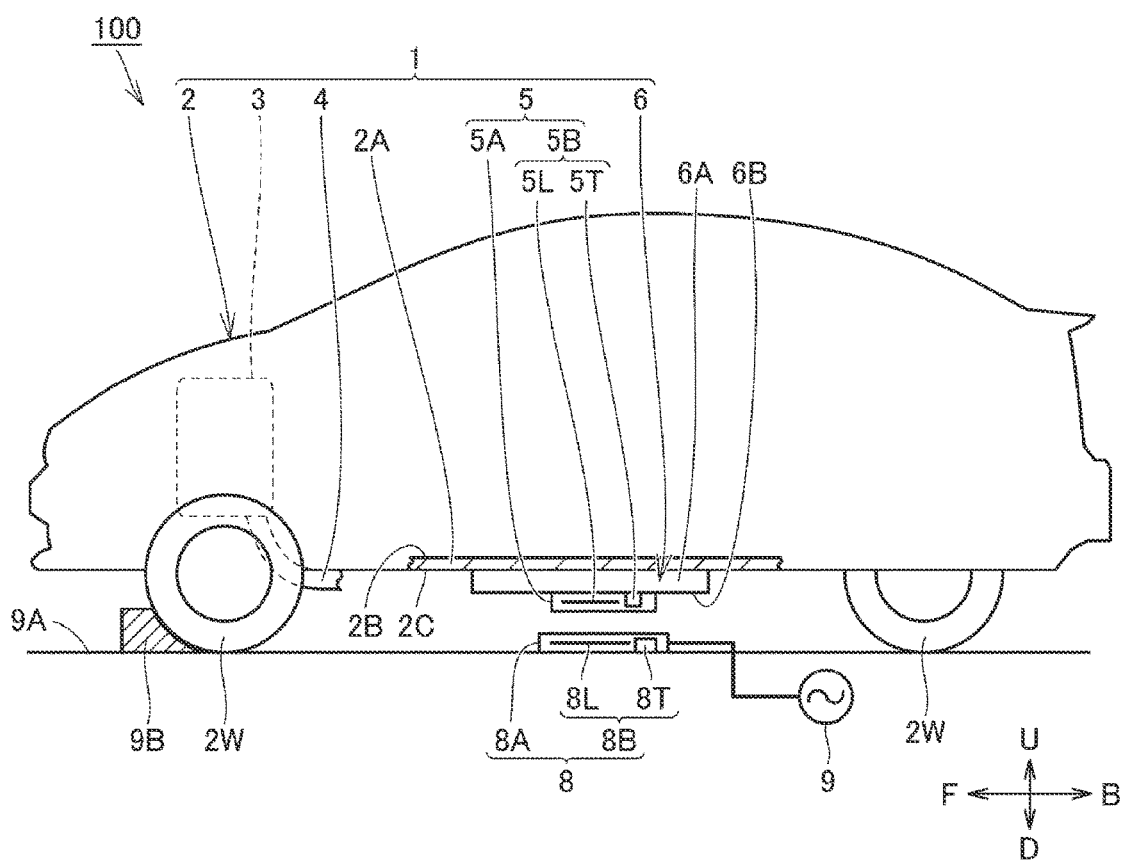
FIG. 1 is a view schematically illustrating a vehicle 1 and a noncontact power transmission and reception system 100 in Embodiment 1.

Embodiments of the present disclosure are described with reference to the drawings. The same reference numeral is assigned to the same component and its equivalent component, and a redundant description may not be repeated.

Embodiment 1

Figure 2:
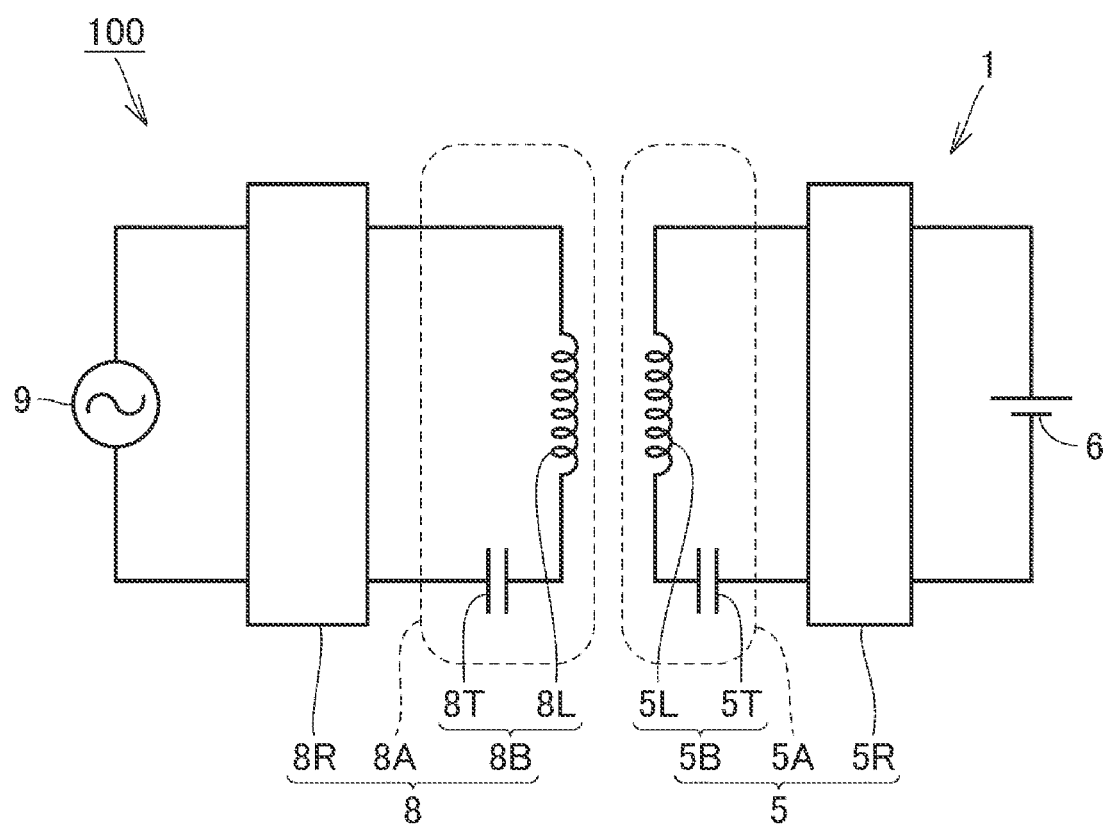
FIG. 2 is a circuit diagram schematically illustrating the vehicle 1 and the noncontact power transmission and reception system 100 in Embodiment 1.

Referring now to FIGS. 1 to 7, the following describes a vehicle 1 and a noncontact power transmission and reception system 100 in Embodiment 1. FIG. 1 is a view schematically illustrating the vehicle 1 and the noncontact power transmission and reception system 100. FIG. 2 is a circuit diagram schematically illustrating the vehicle 1 and the noncontact power transmission and reception system 100.

In FIG. 1, an arrow U indicates an upper direction in a gravitational direction, and an arrow D indicates a lower direction in the gravitational direction. Arrows F, B indicate a vehicle front-rear direction of the vehicle 1. Although not illustrated in FIG. 1, arrows L, R in FIG. 3 and the like indicate a vehicle width direction of the vehicle 1. The meanings of these arrows are common in all the drawings described below.

Noncontact Power Transmission and Reception System 100

Figure 3:
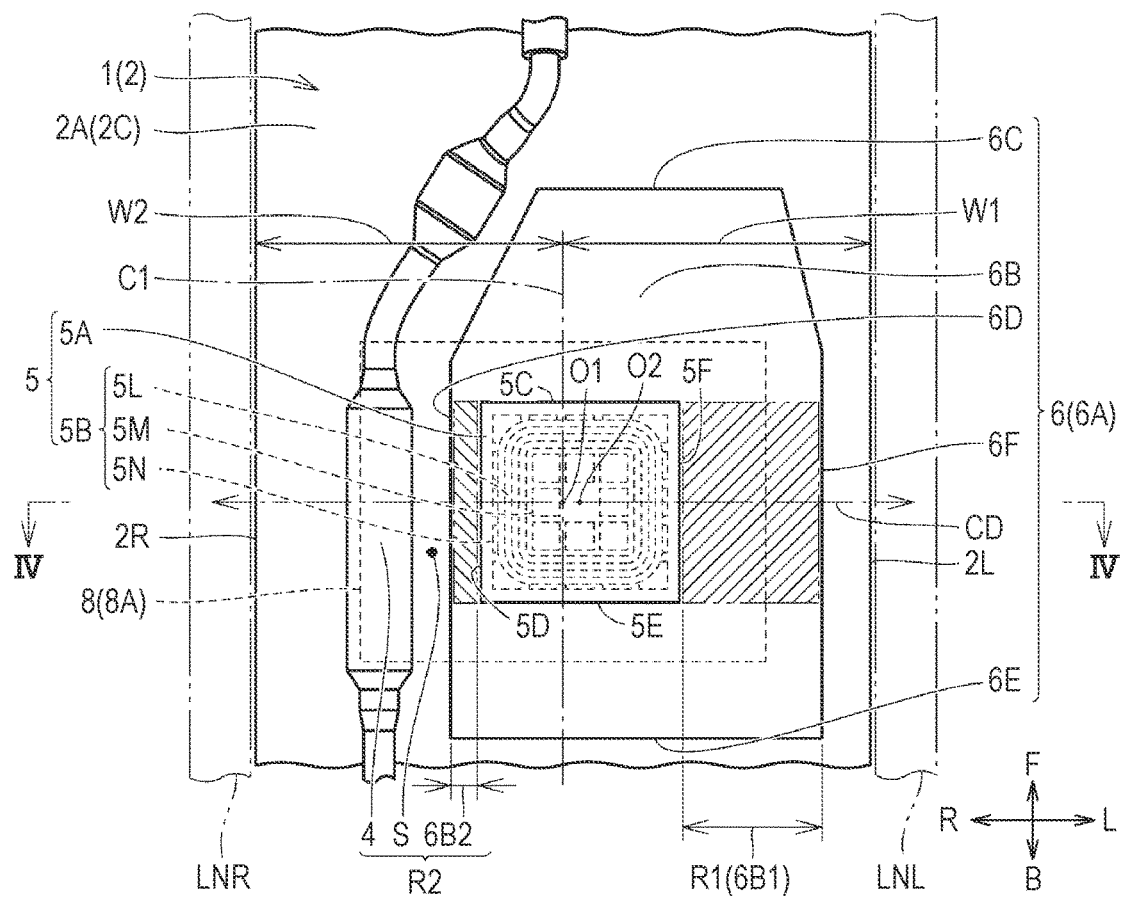
FIG. 3 is a plan view illustrating a floor panel 2A of the vehicle 1 (a vehicle body 2) in the noncontact power transmission and reception system 100 in Embodiment 1, and a muffler 4, a power reception apparatus 5, a power storage apparatus 6, and the like provided on a bottom surface 2C side of the floor panel 2A, and illustrates a state observed when the bottom surface 2C of the vehicle 1 is viewed from a lower side in a gravitational direction.

Referring now to FIGS. 1 and 2, the noncontact power transmission and reception system 100 is provided with a vehicle 1 including a power reception apparatus 5, and a power transmission apparatus 8. The vehicle 1 (FIG. 1) includes a vehicle body 2, an engine 3, a muffler 4, and a power storage apparatus 6, in addition to the power reception apparatus 5. The vehicle body 2 includes a floor panel 2A and wheel assemblies 2W, and the floor panel 2A has a top surface 2B and a bottom surface 2C. The engine 3 is placed inside the vehicle body 2, and a front end of the muffler 4 is connected to the engine 3. For convenience of illustration, only a part of the muffler 4 on a front side is illustrated in FIG. 1. The muffler 4 is provided on the bottom surface 2C side of the vehicle body 2, and extends generally along the vehicle front-rear direction (FIG. 3).

The power reception apparatus 5 includes a housing 5A, a power receiving portion 5B, and a rectifier 5R (FIG. 2), and is provided on the bottom surface 2C side of the vehicle body 2. The housing 5A of the power reception apparatus 5 is fixed to the bottom surface 2C of the vehicle body 2 via the power storage apparatus 6 (a body case 6A). A technical meaning that the power reception apparatus 5 is provided on the bottom surface 2C side of the vehicle body 2 includes not only a case where the housing 5A of the power reception apparatus 5 is indirectly fixed to the bottom surface 2C of the floor panel 2A via the power storage apparatus 6, but also a case where the housing 5A of the power reception apparatus 5 is indirectly fixed to the bottom surface 2C of the floor panel 2A via a metal plate 6S illustrated in FIG. 14, and a case where the housing 5A of the power reception apparatus 5 is directly fixed to the bottom surface 2C of the floor panel 2A.

The power receiving portion 5B of the power reception apparatus 5 includes a power receiving coil 5L configured to receive an electric power from a power transmission coil 8L of the power transmission apparatus 8 in a contactless manner, a capacitor 5T connected in series to the power receiving coil 5L, pieces of ferrite 5M, 5N (FIG. 3, FIG. 4), and a support plate 5G (FIG. 4), which are all accommodated in the housing 5A. An LC resonance circuit is constituted by the power receiving coil 5L and the capacitor 5T. A resonant frequency of the power receiving portion 5B of the power reception apparatus 5 and a resonant frequency of a power transmission portion 8B of the power transmission apparatus 8 are configured to be substantially the same. The rectifier 5R (FIG. 2) of the power reception apparatus 5 converts an alternating-current power that the power receiving portion 5B receives from the power transmission portion 8B, into a direct-current power, and supplies the power to the power storage apparatus 6.

The power storage apparatus 6 is also placed on the bottom surface 2C side of the vehicle body 2. The power storage apparatus 6 includes the body case 6A. The body case 6A has a bottom surface 6B, and the power reception apparatus 5 is placed on the bottom surface 6B side of the power storage apparatus 6. The power reception apparatus 5 and the power storage apparatus 6 are electrically connected to each other by a wiring member (not shown). The wiring member transmits the direct-current power generated by the rectifier 5R (FIG. 2) from the power reception apparatus 5 to the power storage apparatus 6, or transmits a low-voltage signal between the power reception apparatus 5 and the power storage apparatus 6.

The power transmission apparatus 8 includes a housing 8A, the power transmission portion 8B, and a converter 8R (FIG. 2), and is provided within a parking space 9A (FIG. 1). The power transmission portion 8B includes the power transmission coil 8L, a capacitor 8T connected in series to the power transmission coil 8L, pieces of ferrite 8M, 8N (FIG. 4), and a support plate 8G (FIG. 4), which are all accommodated inside the housing 8A. An LC resonance circuit is constituted by the power transmission coil 8L and the capacitor 8T. A Q value of the LC resonance circuit on the power transmission apparatus 8 side and a Q value of the LC resonance circuit on the power reception apparatus 5 side are both 100 or more, for example. The converter 8R (FIG. 2) adjusts a frequency and a voltage of the alternating-current power supplied from the power supply 9, and supplies the alternating-current power to the power transmission portion 8B. When the alternating-current power is supplied to the power transmission portion 8B, magnetic fluxes are formed around the power transmission coil 8L.

Figure 4:
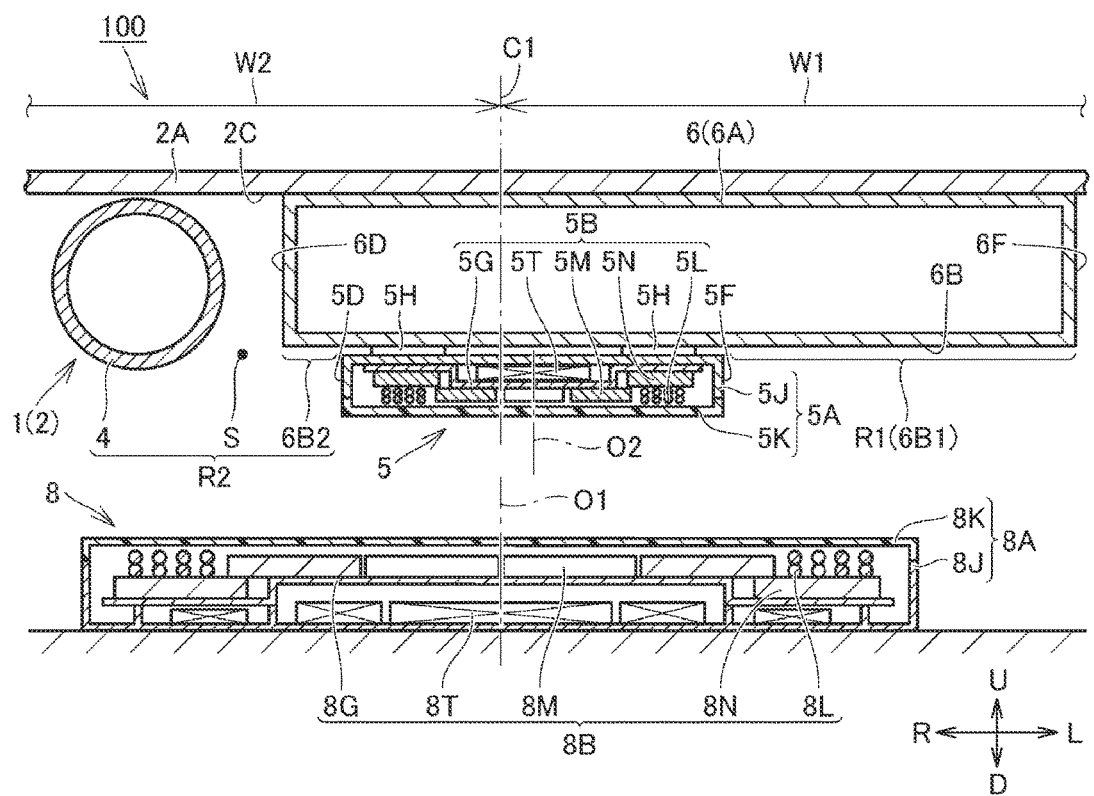
FIG. 4 is a sectional view taken along an arrow IV-IV in FIG. 3.

FIG. 3 is a plan view illustrating the floor panel 2A of the vehicle 1 (the vehicle body 2) in the noncontact power transmission and reception system 100, and the muffler 4, the power reception apparatus 5, the power storage apparatus 6, and the like provided on the bottom surface 2C side of the floor panel 2A, and illustrates a state observed when the bottom surface 2C of the vehicle 1 is viewed from the lower side in the gravitational direction. FIG. 4 is a sectional view taken along an arrow IV-IV in FIG. 3.

With reference to FIGS. 1, 3, 4, the power transmission apparatus 8 is placed inside the parking space 9A (FIG. 1) having a predetermined width. A width direction in the parking space 9A corresponds to a vehicle width direction of the vehicle 1. The parking space 9A is provided with a shoe 9B (FIG. 1) and mark lines LNR, LNL (FIG. 3). The power transmission apparatus 8 is placed so that a winding axis (see a winding axis O1 in FIG. 3) of the power transmission coil 8L extends in the up-down direction (the gravitational direction) at a central position (exactly at a central position between the mark lines LNR, LNL) in the width direction in the parking space 9A. Also in terms of the vehicle 1, the power reception apparatus 5 is provided on the bottom surface 2C side of the vehicle body 2 so that a winding axis (see a winding axis O2 in FIG. 3) of the power receiving coil 5L extends in the up-down direction.

The vehicle 1 is put into the parking space 9A and aligned in the vehicle front-rear direction and in the vehicle width direction, by use of the shoe 9B (FIG. 1), the mark lines LNR, LNL (FIG. 3), and the like. The alignment may be performed by a control operation using a sensor, a camera, or the like, or may be performed by a manual operation of a driver. The alignment may be performed by the control operation and the manual operation in combination. In a state where the vehicle 1 is aligned in the parking space 9A, the vehicle 1 can receive an electric power from the power transmission apparatus 8 through the power reception apparatus 5 in a contactless manner.

Detailed Configuration of Vehicle 1

Referring now to FIGS. 3 and 4, the vehicle body 2 (the floor panel 2A) has the bottom surface 2C. The bottom surface 2C of the vehicle body 2 has a central position C1 positioned in the center in the vehicle width direction. In the vehicle width direction, a distance W1 between the central position C1 and a side surface 2L positioned on an arrow L side of the vehicle body 2 is equal to a distance W2 between the central position C1 and a side surface 2R positioned on an arrow R side of the vehicle body 2.

Power Storage Apparatus 6

The power storage apparatus 6 is placed on the bottom surface 2C side of the vehicle body 2 (the floor panel 2A). A power storage element (not shown) is accommodated inside the body case 6A of the power storage apparatus 6. The body case 6A includes a top surface (FIG. 4), a bottom surface 6B, a front wall 6C (FIG. 3), a side wall 6D, a rear wall 6E (FIG. 3), and a side wall 6F, and has a box shape as a whole. The top surface of the body case 6A is fixed to the bottom surface 2C of the floor panel 2A by use of bolts or the like (not shown). The housing 5A of the power reception apparatus 5 is fixed to the bottom surface 6B of the body case 6A via a fixing member 5H (FIG. 4).

The front wall 6C (FIG. 3) and the rear wall 6E of the body case 6A have a shape extending along the vehicle width direction. The side walls 6D, 6F of the body case 6A have a shape extending along the vehicle front-rear direction. The side wall 6F of the body case 6A is positioned on the arrow L side (a side closer to the side surface 2L) relative to the central position C1. The side wall 6D of the body case 6A is positioned on the arrow R side (a side closer to the side surface 2R) relative to the central position C1.

The body case 6A of the power storage apparatus 6 is placed at a position offset to the arrow L side (the side closer to the side surface 2L) relative to the central position C1 as a whole, so as to allow the muffler 4 to be placed. That is, in the vehicle width direction, a distance between the central position C1 and the side wall 6F of the body case 6A is longer than a distance between the central position C1 and the side wall 6D of the body case 6A.

Here, in the vehicle width direction, a width of the bottom surface 6B of the body case 6A is larger than a width of the housing 5A of the power reception apparatus 5. The bottom surface 6B of the body case 6A has exposed portions 6B1, 6B2. The exposed portions 6B1, 6B2 are parts of the bottom surface 6B of the power storage apparatus 6 and are positioned so as to be adjacent to the housing 5A of the power reception apparatus 5 in the vehicle width direction when the bottom surface 6B of the power storage apparatus 6 is planarly viewed from the lower side.

The exposed portion 6B1 is a part with hatching directed toward a right upper side in FIG. 3, and is positioned on one side (a side closer to the side surface 2L) in the vehicle width direction relative to the housing 5A of the power reception apparatus 5. The exposed portion 6B2 is a part with hatching directed toward a right lower side in FIG. 3, and is positioned on the other side (a side closer to the side surface 2R) in the vehicle width direction relative to the housing 5A of the power reception apparatus 5. A width of the exposed portion 6B2 is narrower than a width of the exposed portion 6B1.

First Region R1

A member constituting the bottom surface 6B of the body case 6A is, for example, aluminum. Alternatively, the bottom surface 6B of the body case 6A can be constituted by a member having a lower magnetic permeability and a lower electric resistance than a magnetic permeability and an electric resistance of aluminum, respectively. In the present embodiment, the exposed portion 6B1 of the power storage apparatus 6 (the bottom surface 6B of the body case 6A) constitutes a first region R1. The first region R1 is made of aluminum, or is formed so that a magnetic permeability and an electric resistance are lower than the magnetic permeability and the electric resistance of aluminum. A technical meaning of the first region R1 will be described later.

Power Reception Apparatus 5

The housing 5A (FIG. 4) of the power reception apparatus 5 includes a main body 5J opened downward, and a cover 5K configured to close the opening of the main body 5J. The main body 5J is made of a metal member, and the cover 5K is made of a member, such as resin, through which magnetic fluxes can be passed. The main body 5J and the cover 5K form a box shape as a whole, and have a top surface, a bottom surface, a front wall 5C (FIG. 3), a side wall 5D, a rear wall 5E, and a side wall 5F.

The top surface (FIG. 4) of the housing 5A is fixed to the bottom surface 6B of the power storage apparatus 6 via the fixing member 5H. A technical meaning that the power reception apparatus 5 is provided on the bottom surface 2C side of the vehicle body 2 includes such a fixation manner. The front wall 5C (FIG. 3) and the rear wall 5E of the housing 5A have a shape extending along the vehicle width direction. The side walls 5D, 5F of the housing 5A have a shape extending along the vehicle front-rear direction. The side wall 5F of the housing 5A is positioned on the arrow L side (the side closer to the side surface 2L) relative to the central position C1. The side wall 5D of the housing 5A is positioned on the arrow R side (the side closer to the side surface 2R) relative to the central position C1.

Although details are described later, in the present embodiment, the winding axis O2 of the power receiving coil 5L is placed at a position deviating toward one side in a reference direction CD (here, the side closer to the side surface 2L) from the central position C1 of the vehicle body 2 in the vehicle width direction. The reference direction CD as used herein is a direction intersecting with the winding axis O2 of the power receiving coil 5L and parallel to the vehicle width direction.

In the present embodiment, the housing 5A of the power reception apparatus 5 is also placed at a position offset to the arrow L side (the side closer to the side surface 2L) as a whole relative to the central position C1. In the vehicle width direction, a distance between the central position C1 and the side wall 5F of the housing 5A is longer than a distance between the central position C1 and the side wall 5D of the housing 5A. In some embodiments, a feature that the housing 5A is placed as described above can be employed because the feature can easily realize a configuration in which the winding axis O2 of the power receiving coil 5L is placed at a deviating position as described above.

The power receiving portion 5B is accommodated in the housing 5A. The power receiving portion 5B includes the power receiving coil 5L, the capacitor 5T (FIG. 4), the support plate 5G (FIG. 4), and a plurality of pieces of ferrite 5M, 5N. The support plate 5G has a central portion projecting downward, and an outer peripheral portion placed around the central portion. A recessed space is formed on a top side of the central portion of the support plate 5G, so that the capacitor 5T and the like are placed inside the recessed space.

The plurality of pieces of ferrite 5M is arranged annularly on a bottom surface of the central portion of the support plate 5G (FIG. 3), and the plurality of pieces of ferrite 5N is arranged annularly on a bottom surface of the outer peripheral portion of the support plate 5G. The ferrite 5M makes contact with an inner peripheral portion of the ferrite 5N (FIG. 4). The power receiving coil 5L is a so-called spiral coil, and is placed annularly on bottom surfaces of the pieces of ferrite 5N so as to surround the pieces of ferrite 5M. As described above, the power reception apparatus 5 is provided on the bottom surface 2C side of the vehicle body 2, so that the winding axis O2 of the power receiving coil 5L extends in the up-down direction (in a direction parallel to a vehicle-height direction).

Muffler 4

The muffler 4 is fixed to the bottom surface 2C side of the floor panel 2A with a fixing member (not shown). In the present embodiment, when the bottom surface 2C of the vehicle body 2 is planarly viewed from the lower side in the gravitational direction, the muffler 4 is placed at a position adjacent to the housing 5A of the power reception apparatus 5 in the vehicle width direction. More specifically, the muffler 4 is placed at a position on the other side (the side closer to the side surface 2R) in the vehicle width direction relative to the housing 5A of the power reception apparatus 5.

The muffler 4 is constituted by an inner pipe, a noise reduction material provided around the inner pipe, and a metal cover provided around the noise reduction material, for example. The metal cover of the muffler 4 constitutes an outer shell of the muffler 4, and is made of a metal member mainly constituted by at least one of iron and stainless, for example.

Second Region R2

With reference to FIG. 4, when the direction intersecting with the winding axis O2 of the power receiving coil 5L and parallel to the vehicle width direction is assumed the reference direction CD as described above, the first region R1 made of aluminum or formed so that the magnetic permeability and the electric resistance are lower than the magnetic permeability and the electric resistance of aluminum, respectively, is provided at a position on the one side (the side closer to the side surface 2L) in the reference direction CD relative to the housing 5A of the power reception apparatus 5.

Meanwhile, a space and/or a second region R2 formed so that a magnetic permeability and an electric resistance thereof are higher than the magnetic permeability and the electric resistance of the first region R1, respectively, is provided at a position on the other side (the side closer to the side surface 2R) in the reference direction CD relative to the housing 5A of the power reception apparatus 5. In the present embodiment, in the vehicle width direction, a space S and the exposed portion 6B2 of the power storage apparatus 6 (the body case 6A) are provided between the muffler 4 and the side wall 5D of the power reception apparatus 5 (the housing 5A). The second region R2 is constituted by a part of the muffler 4 on the lower side (a part of the muffler 4, the part opposed to the power transmission coil 8L of the power transmission apparatus 8), the space S, and the exposed portion 6B2. The second region R2 is formed such that the magnetic permeability and the electric resistance thereof are higher than the magnetic permeability and the electric resistance of the first region R1, respectively.

A magnetic permeability and an electric resistance of the member constituting the metal cover of the muffler 4 are higher than the magnetic permeability and the electric resistance of the member (e.g., aluminum) forming the first region R1, respectively. In a case where metal mainly containing iron is employed as the member constituting the metal cover of the muffler 4, the metal cover of the muffler 4 can be made of, for example, pure iron (99.95%), pure iron (99.8%), iron cobalt alloy, permalloy (registered trademark) (Fe—Ni alloy), ferrosilicon (alloy obtained by adding a small amount of silicon to iron), and the like. In a case where metal mainly containing stainless is employed as the member constituting the metal cover of the muffler 4, the metal cover of the muffler 4 can be made of ferritic stainless steel, martensitic stainless steel, and the like.

A magnetic permeability of iron (pure iron (99.95%)) is $2.5 \times 10^{-1}$ [H/m], and a magnetic permeability of iron (pure iron (99.8%)) is $6.3 \times 10^{-3}$ [H/m]. A magnetic permeability of iron cobalt alloy is $2.3 \times 10^{-2}$ [H/m], and a magnetic permeability of permalloy (registered trademark) (Fe—Ni alloy) is $1.0 \times 10^{-2}$ [H/m]. A magnetic permeability of ferrosilicon (alloy obtained by adding a small amount of silicon to iron) is $5.0 \times 10^{-3}$ [H/m]. A magnetic permeability of ferritic stainless steel is about not less than $1.26 \times 10^{-3}$ [H/m] but not more than $2.26 \times 10^{-3}$ [H/m]. A magnetic permeability of martensitic stainless steel is about not less than $9.42 \times 10^{-4}$ [H/m] but not more than $1.19 \times 10^{-3}$ [H/m]. Further, an electric resistance of iron is $1.00 \times 10^{-7}$ ($\Omega$m), and an electric resistance of stainless is $7.2 \times 10^{-7}$ ($\Omega$m). On the other hand, a magnetic permeability of aluminum is $1.256 \times 10^{-6}$ [H/m], and an electric resistance of aluminum is $2.65 \times 10^{-8}$ ($\Omega$m).

As described above, in the present embodiment, the member constituting the bottom surface 6B of the body case 6A is aluminum and the exposed portion 6B2 is also constituted by aluminum. The metal cover of the muffler 4 is made of a metal material mainly containing at least one of iron and stainless, and has a higher magnetic permeability and a higher electric resistance than the magnetic permeability and the electric resistance of the exposed portion 6B2 (e.g., aluminum), respectively.

The metal cover of the muffler 4 has a magnetic permeability higher than the magnetic permeability of aluminum, and magnetic fluxes from the power transmission coil 8L easily enter the metal cover and easily pass through the metal cover. In addition to such a property of the metal cover, the metal cover constituting the outer shell of the muffler 4 has an electric resistance higher than the electric resistance of the exposed portion 6B2 (e.g., aluminum).

Since the metal cover has a higher electric resistance, when the magnetic fluxes enter the metal cover, an eddy current can hardly flow through an outer layer part of the metal cover. When the eddy current flows, a magnetic field that reflects the magnetic fluxes from the power transmission coil 8L is formed around the eddy current. However, since the eddy current can hardly flow through the outer layer part of the metal cover having an electric resistance higher than aluminum, a strength of the magnetic field formed by the eddy current is weak, and the magnetic fluxes to enter the metal cover can hardly be reflected.

In the meantime, the metal such as aluminum constituting the exposed portion 6B2 has a magnetic permeability lower than the magnetic permeability of iron or stainless, and the magnetic fluxes from the power transmission coil 8L can hardly enter the exposed portion 6B2 and also can hardly pass through the exposed portion 6B2. In addition to such a property of the exposed portion 6B2, the exposed portion 6B2 (e.g., aluminum) has an electric resistance lower than the electric resistance of iron or stainless.

Since the exposed portion 6B2 has a low magnetic permeability, the magnetic fluxes from the power transmission coil 8L can hardly enter the exposed portion 6B2 in the first place. However, when the magnetic fluxes enter the exposed portion 6B2, an eddy current easily flows through an outer layer part of the exposed portion 6B2, because the exposed portion 6B2 has a low electric resistance. When the eddy current flows, a magnetic field reflecting the magnetic fluxes from the power transmission coil 8L is formed around the eddy current. Since the eddy current easily flows through the outer layer part of the exposed portion 6B2 having an electric resistance lower than iron or stainless, a strength of the magnetic field formed by the eddy current is strong, and the magnetic fluxes to enter the exposed portion 6B2 are easily reflected. The properties as described above about the exposed portion 6B2 are also common to the exposed portion 6B1 constituting the first region R1.

The space S is provided between the muffler 4 and the exposed portion 6B2 having the above properties, so that the second region R2 is formed as a whole such that the magnetic permeability and the electric resistance of the second region R2 are higher than the magnetic permeability and the electric resistance of the first region R1, respectively. A metal heat insulator made of aluminum, a plating steel sheet, or the like is often placed around the muffler 4. However, in a case where the heat insulator has a part adjacent to the power reception apparatus 5 in the vehicle width direction, the first region R1 and the second region R2 are formed as a whole such that the magnetic permeability and the electric resistance of the second region R2 are higher than the magnetic permeability and the electric resistance of the first region R1, respectively, including such a part. That is, in the present embodiment, regions (the first region R1 and the second region R2) having different magnetic permeabilities and different electric resistances are formed around the power reception apparatus 5.

Power Transmission Apparatus 8

The housing 8A (FIG. 4) of the power transmission apparatus 8 includes a main body 8J opened upward, and a cover 8K configured to close the opening of the main body 8J. The main body 8J is made of a metal member, and the cover 8K is made of a member, such as resin, through whish magnetic fluxes can be passed. The main body 8J and the cover 8K have a box shape as a whole. The power transmission portion 8B is accommodated in the housing 8A.

The power transmission portion 8B includes the power transmission coil 8L, the capacitor 8T (FIG. 4), the support plate 8G (FIG. 4), and a plurality of pieces of ferrite 8M, 8N. The support plate 8G has a central portion projecting upward, and an outer peripheral portion placed around the central portion. A recessed space is formed on a bottom side of the central portion of the support plate 8G, so that the capacitor 8T and the like are placed inside the recessed space.

The plurality of pieces of ferrite 8M is arranged annularly on a top surface of the central portion of the support plate 8G, and the plurality of pieces of ferrite 8N is arranged annularly on a top surface of the outer peripheral portion of the support plate 8G. The ferrite 8M makes contact with an inner peripheral portion of the ferrite 8N. The power transmission coil 8L is a so-called spiral coil, and is placed annularly on top surfaces of the pieces of ferrite 8N so as to surround the pieces of ferrite 8M. As described above, the power transmission apparatus 8 is placed inside the parking space 9A (FIG. 1), so that the winding axis O1 of the power transmission coil 8L extends in the up-down direction (in a direction parallel to the gravitational direction). The winding axis O1 of the power transmission coil 8L is positioned at a center (exactly a center between the mark lines LNR, LNL illustrated in FIG. 3) of the parking space 9A in the width direction.

Noncontact Power Transmission and Reception

Figure 5:
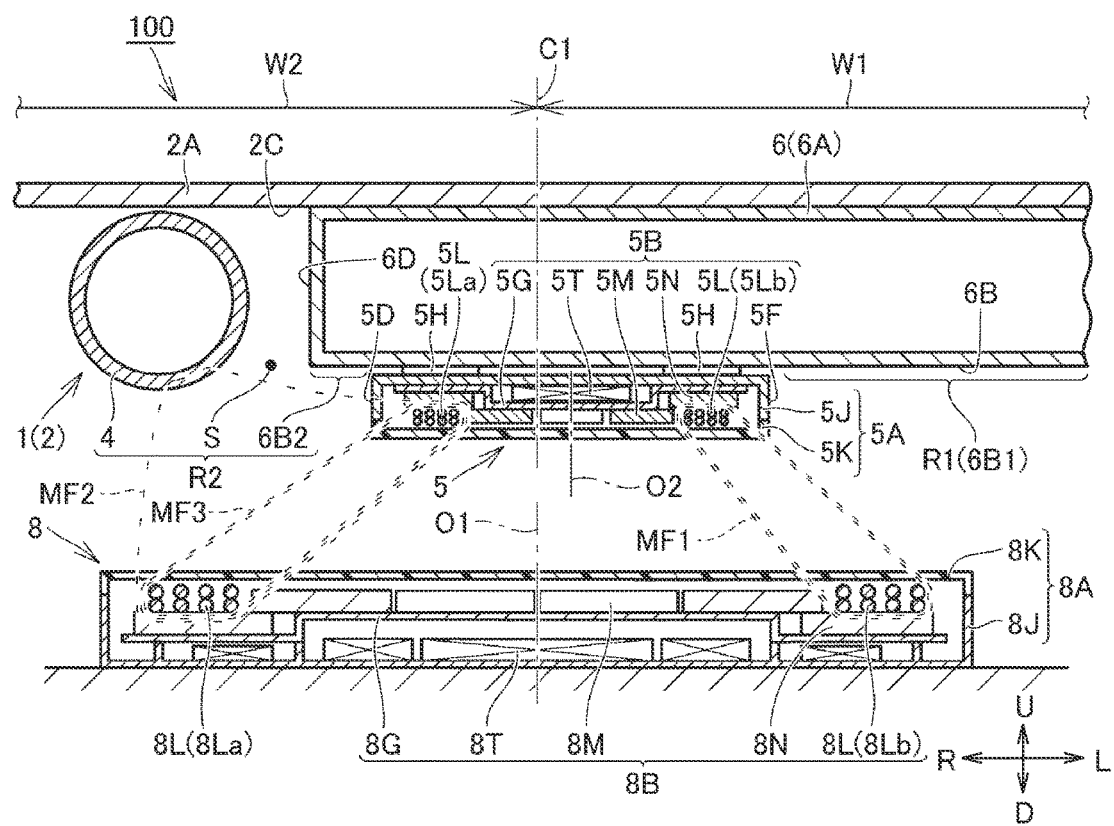
FIG. 5 is a sectional view illustrating a state where a power transmission apparatus 8 and the power reception apparatus 5 of the vehicle 1 perform power transmission and reception in a contactless manner in a state where the vehicle 1 in Embodiment 1 is aligned in a parking space 9A (FIG. 1)

In the noncontact power transmission and reception system 100, noncontact power transmission and reception is performed between the power transmission apparatus 8 and the power reception apparatus 5 of the vehicle 1. FIG. 5 is a sectional view illustrating a state where the power transmission apparatus 8 and the power reception apparatus 5 of the vehicle 1 perform power transmission and reception in a contactless manner in a state where the vehicle 1 is aligned in the parking space 9A (FIG. 1) (in other words, the central position C1 of the vehicle 1 and the winding axis O1 of the power transmission coil 8L accord with each other).

The noncontact power transmission and reception system 100 has a predetermined allowable range as a deviation range allowable between the winding axis O2 of the power receiving coil 5L and the winding axis O1 of the power transmission coil 8L. In a case where a deviation amount of the winding axis O2 from the winding axis O1 falls within the predetermined allowable range, when the power transmission coil 8L transmits an electric power to the power receiving coil 5L, a transmission efficiency with a predetermine value or more is obtained. In a case where the deviation amount of the winding axis O2 from the winding axis O1 exceeds the predetermined allowable range, when the power transmission coil 8L transmits an electric power to the power receiving coil 5L, a transmission efficiency with less than the predetermined value is obtained. In the present embodiment, when the transmission efficiency is less than the predetermined value, the power transmission and reception is not started or is stopped.

In the present embodiment, an exterior shape of the power transmission coil 8L wound annularly is larger than an exterior shape of the power receiving coil 5L wound annularly. In a case where the power receiving coil 5L and the power transmission coil 8L have a positional relationship in which the deviation amount of the winding axis O2 from the winding axis O1 falls within the predetermined allowable range, the whole power receiving coil 5L and at least a part of the muffler 4 are positioned inside the exterior shape of the power transmission coil 8L (an outer peripheral edge of the power transmission coil 8L) when the muffler 4, the power receiving coil 5L, and the power transmission coil 8L are planarly viewed from the lower side in the gravitational direction.

In the case where the power receiving coil 5L and the power transmission coil 8L have a positional relationship in which the deviation amount of the winding axis O2 from the winding axis O1 falls within the predetermined allowable range, at least a part of the first region R1 in the present embodiment is positioned inside the exterior shape of the power transmission coil 8L (the outer peripheral edge of the power transmission coil 8L) when the first region R1 is planarly viewed from the lower side in the gravitational direction.

Similarly, in the case where the power receiving coil 5L and the power transmission coil 8L have a positional relationship in which the deviation amount of the winding axis O2 from the winding axis O1 falls within the predetermined allowable range, at least a part of the second region R2 in the present embodiment is positioned inside the exterior shape of the power transmission coil 8L (the outer peripheral edge of the power transmission coil 8L) when the second region R2 is planarly viewed from the lower side in the gravitational direction.

The magnetic fluxes from the power transmission coil 8L hardly reach parts of various members constituting the vehicle 1, the parts being positioned outside the exterior shape of the power transmission coil 8L (the outer peripheral edge of the power transmission coil 8L), for example, when planarly viewed from the lower side in the gravitational direction. Accordingly, an influence of those parts to the noncontact power transmission and reception is small. Further, for example, among the various members constituting the vehicle 1, a member positioned on an upper side relative to a central part of the power storage apparatus 6 (the body case 6A) in a thickness direction hardly receives the magnetic fluxes from the power transmission coil 8L. Accordingly, an influence of the member to the noncontact power transmission and reception is also small.

A degree of the influence changes depending on a magnitude of an electric power to be supplied to the power transmission coil 8L (a magnetic field intensity formed around the power transmission coil 8L), a distance between the power reception apparatus 5 and the power transmission apparatus 8, materials or various members constituting the power reception apparatus 5 and the power transmission apparatus 8, a temperature of the atmosphere around the power reception apparatus 5 and the power transmission apparatus 8, and the like. However, among various members constituting the noncontact power transmission and reception system 100 (the vehicle 1 and the power transmission apparatus 8), parts positioned away from the power transmission coil 8L and the power receiving coil 5L have little influence to the noncontact power transmission and reception, so those parts shall not be included in the following discussion. The noncontact power transmission and reception performed by use of the power reception apparatus 5 and the power transmission apparatus 8 configured as described above will be described with reference to FIGS. 5 to 7.

Aligned State

As illustrated in FIG. 5, in the present embodiment, in a state where the power reception apparatus 5 and the power transmission apparatus 8 are aligned to each other (in a state where the central position C1 of the vehicle body 2 accords with the winding axis O1 of the power transmission coil 8L in the reference direction CD (FIG. 3)), the winding axis O2 of the power receiving coil 5L is placed at a position deviating from the central position C1 of the vehicle body 2 toward the one side in the reference direction CD (the arrow L side).

As illustrated in FIG. 5, when the sectional shape along the reference direction CD (FIG. 3) and the gravitational direction is viewed, the power receiving coil 5L includes a coil portion 5La positioned on the arrow R side and a coil portion 5Lb positioned on the arrow L side. Similarly, the power transmission coil 8L includes a coil portion 8La positioned on the arrow R side and a coil portion 8Lb positioned on the arrow L side. In the present embodiment, in a state where the power reception apparatus 5 and the power transmission apparatus 8 are aligned to each other, a distance between the coil portions 5La and 8La is longer than a distance between the coil portions 5Lb and 8Lb. Among the magnetic fluxes formed around the power transmission coil 8L, an amount (magnetic flux density) of magnetic fluxes reaching the power receiving coil 5L and crossing the power receiving coil 5L is basically inversely proportional to the distance between the power transmission coil 8L and the power receiving coil 5L.

Some parts of magnetic fluxes MF1 formed around the power transmission coil 8L (8Lb) loop back on themselves or are reflected by the exposed portion 6B1 so as not to cross the power receiving coil 5L (5Lb), but the other parts of the magnetic fluxes MF1 cross the power receiving coil 5L (5Lb).

Some parts of magnetic fluxes MF3 formed around the power transmission coil 8L (8La) also loop back on themselves or are reflected by the exposed portion 6B2 so as not to cross the power receiving coil 5L (5La), but the other parts of the magnetic fluxes MF3 cross the power receiving coil 5L (5La).

Some parts of magnetic fluxes MF2 formed around the power transmission coil 8L (8La) loop back on themselves or enter the metal cover of the muffler 4. As described above, the metal cover is made of metal having a high magnetic permeability and a high electric resistance. The magnetic fluxes MF2 entering the metal cover flow through the metal cover, and then, are emitted from a surface of the metal cover to outside the metal cover.

A lower part of the metal cover is placed to be adjacent to the power receiving coil 5L in the vehicle width direction. Some parts of the magnetic fluxes MF2 entering the lower part of the muffler 4 are emitted toward the power receiving coil 5L from the lower part, so as to cross the power receiving coil 5L. That is, when there is no muffler 4, most of the magnetic fluxes MF2 formed around the power transmission coil 8L (8La) loop back on themselves and do not cross the power receiving coil 5L (5La). In the present embodiment, due to the existence of the lower part of the muffler 4 (the metal cover), some parts of the magnetic fluxes MF2 formed around the power transmission coil 8L (8La) are guided toward the power receiving coil 5L (5La), so as to cross the power receiving coil 5L (5La).

Positional Deviation Toward Arrow L Side

Figure 6:
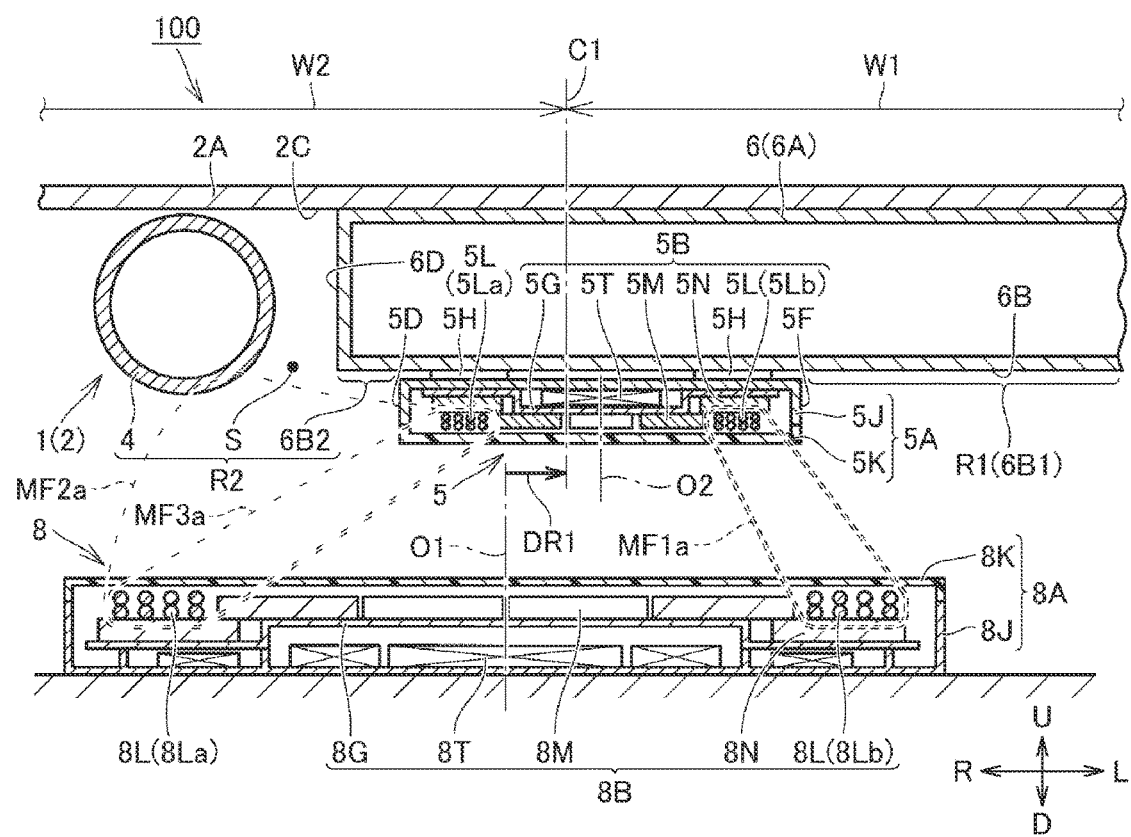
FIG. 6 is a sectional view illustrating a state where a power receiving coil 5L deviates from a power transmission coil 8L toward an arrow L side only by a distance DR1, from the state illustrated in FIG. 5.

FIG. 6 is a sectional view illustrating a state where the power receiving coil 5L deviates from the power transmission coil 8L toward the arrow L side only by a distance DR1, from the state illustrated in FIG. 5. When the power receiving coil 5L deviates from the power transmission coil 8L toward the arrow L side, the distance between the coil portions 5Lb and 8Lb is shorter than the case of FIG. 5, whereas the distance between the coil portions 5La and 8La is longer than the case of FIG. 5. The lower part of the muffler 4 (the metal cover) is positioned above the power transmission coil 8L (8La) (positioned inside the exterior shape of the coil portion 8La, in a plan view).

Among magnetic fluxes formed around the power transmission coil 8L (8Lb), an amount of magnetic fluxes reflected by the exposed portion 6B1 is decreased in comparison with the case of FIG. 5, and an amount of magnetic fluxes MF1a crossing the power receiving coil 5L (5Lb) is increased in comparison with the magnetic fluxes MF1 (FIG. 5). In the meantime, an amount of magnetic fluxes MF3a formed around the power transmission coil 8L (8La) and crossing the power receiving coil 5L (5La) is decreased in comparison with the magnetic fluxes MF3 (FIG. 5).

Some parts of magnetic fluxes MF2a formed around the power transmission coil 8L (8La) are guided by the metal cover of the muffler 4 so as to cross the power receiving coil 5L (5La). As a whole of the noncontact power transmission and reception system 100, the amount of the magnetic fluxes MF3a is decreased in comparison with the magnetic fluxes MF3 (FIG. 5). However, the amount of the magnetic fluxes MF1a is increased in comparison with the magnetic fluxes MF1 (FIG. 5), and the magnetic fluxes MF2a that can cross the power receiving coil 5L (5La) exist, so that a coupling coefficient in the case of FIG. 6 is restrained from being greatly decreased from a coupling coefficient in the case of FIG. 5.

Positional Deviation Toward Arrow R Side

Figure 7:
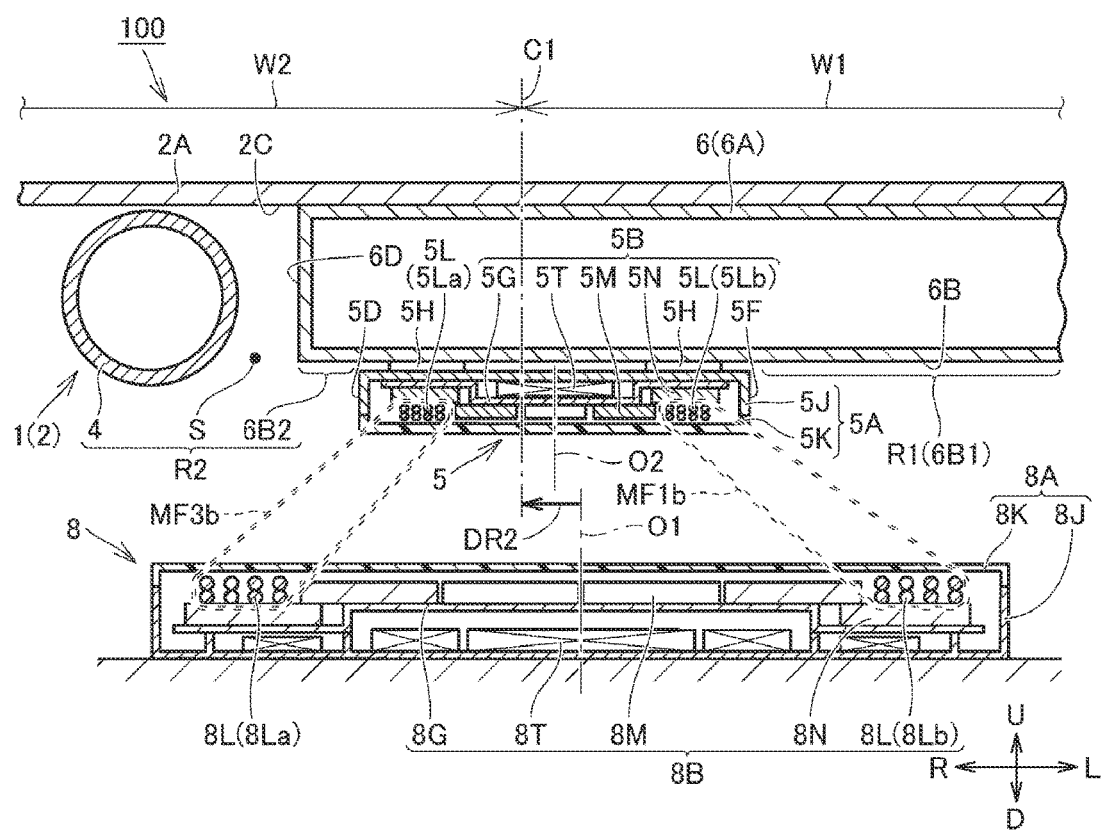
FIG. 7 is a sectional view illustrating a state where the power receiving coil 5L deviates from the power transmission coil 8L toward an arrow R side only by a distance DR2, from the state illustrated in FIG. 5.

FIG. 7 is a sectional view illustrating a state where the power receiving coil 5L deviates from the power transmission coil 8L toward the arrow R side only by a distance DR2, from the state illustrated in FIG. 5. The distance DR2 is generally the same as the distance DR1 (FIG. 6). When the power receiving coil 5L deviates from the power transmission coil 8L toward the arrow R side, the distance between the coil portions 5Lb and 8Lb is longer than the case of FIG. 5, whereas the distance between the coil portions 5La and 8La is shorter than the case of FIG. 5. Most of the lower part of the muffler 4 (the metal cover) is not positioned above the power transmission coil 8L (8La), and is positioned outside the exterior shape of the coil portion 8La, in a plan view.

Among magnetic fluxes formed around the power transmission coil 8L (8Lb), an amount of magnetic fluxes reflected by the exposed portion 6B1 is increased in comparison with the case of FIG. 5, and an amount of magnetic fluxes MF1b crossing the power receiving coil 5L (5Lb) is decreased in comparison with the magnetic fluxes MF1 (FIG. 5). In the meantime, an amount of magnetic fluxes MF3b formed around the power transmission coil 8L (8La) and crossing the power receiving coil 5L (5La) is increased in comparison with the magnetic fluxes MF3 (FIG. 5).

Magnetic fluxes formed around the power transmission coil 8L (8La) are hardly guided to the metal cover of the muffler 4. As a whole of the noncontact power transmission and reception system 100, the amount of the magnetic fluxes MF1b is decreased in comparison with the magnetic fluxes MF1 (FIG. 5), and a guiding effect by the muffler is hardly obtained. However, the amount of the magnetic fluxes MF3b is increased in comparison with the magnetic fluxes MF3 (FIG. 5), so that a coupling coefficient in the case of FIG. 7 is restrained from being greatly decreased from the coupling coefficient in the case of FIG. 5.

In the present embodiment, as described above, the regions (the first region R1 and the second region R2) having different magnetic permeabilities and different electric resistances are formed around the power reception apparatus 5. In a state where the power reception apparatus 5 and the power transmission apparatus 8 are aligned to each other (in a state where the central position C1 of the vehicle body 2 accords with the winding axis O1 of the power transmission coil 8L in the reference direction CD (FIG. 3)), the winding axis O2 of the power receiving coil 5L is placed at a position deviating from the central position C1 (and the wading axis O1) of the vehicle body 2 toward the one side (the arrow L side) in the reference direction CD.

With the above configuration, even if the power receiving coil 5L deviates from the power transmission coil 8L toward the arrow L side (FIG. 6), or even if the power receiving coil 5L deviates from the power transmission coil 8L toward the arrow R side (FIG. 7), it is possible to restrain variations in the coupling coefficient between the power receiving coil 5L and the power transmission coil 8L, thereby making it possible to achieve noncontact charging efficiency with few variations with respect to a positional deviation. A principle that such an operation and an effect are obtained with the configuration will be described below while comparing the present embodiment 1 with Comparative Example 1.

Comparative Example 1

Figure 8:
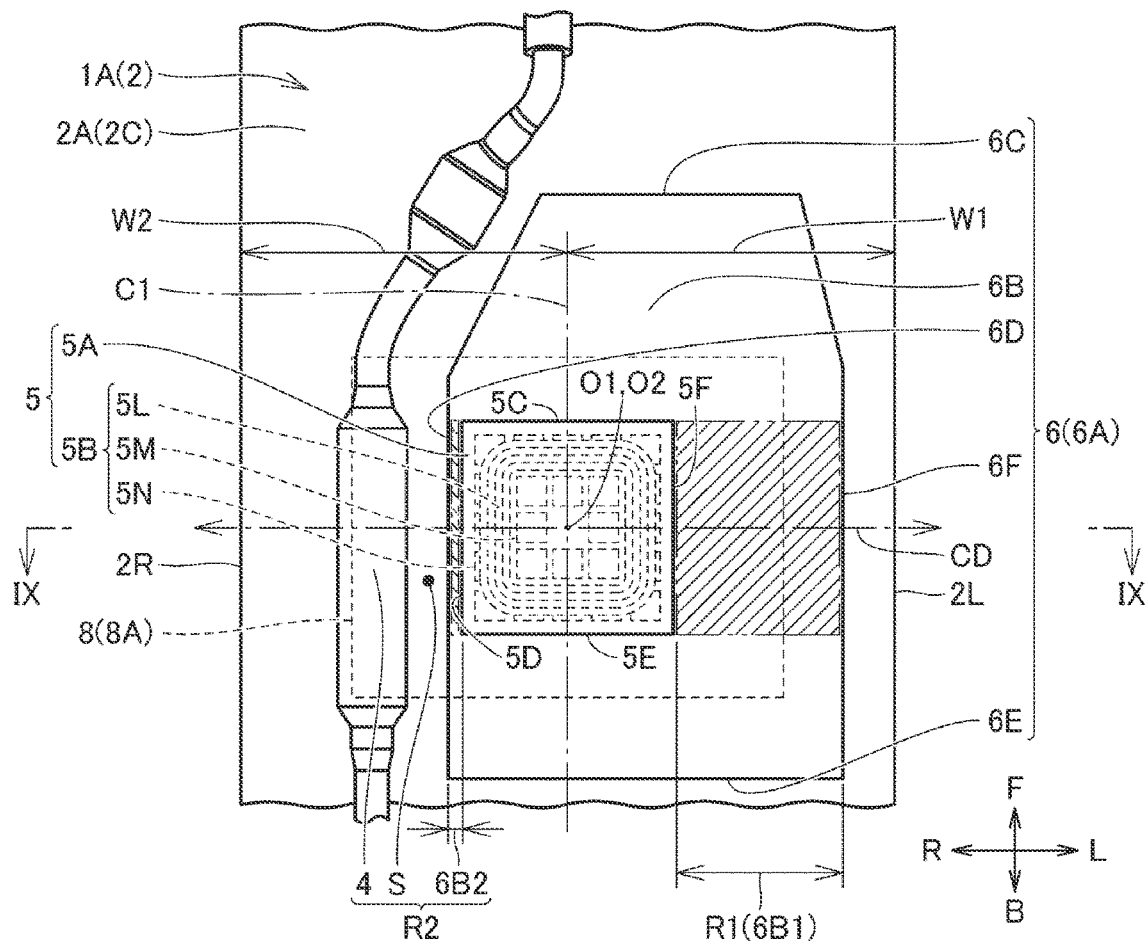
FIG. 8 is a plan view illustrating a vehicle 1A (a vehicle body 2) in Comparative Example 1, and illustrates a state observed when a bottom surface 2C of the vehicle 1A is viewed from the lower side in the gravitational direction.
Figure 9:
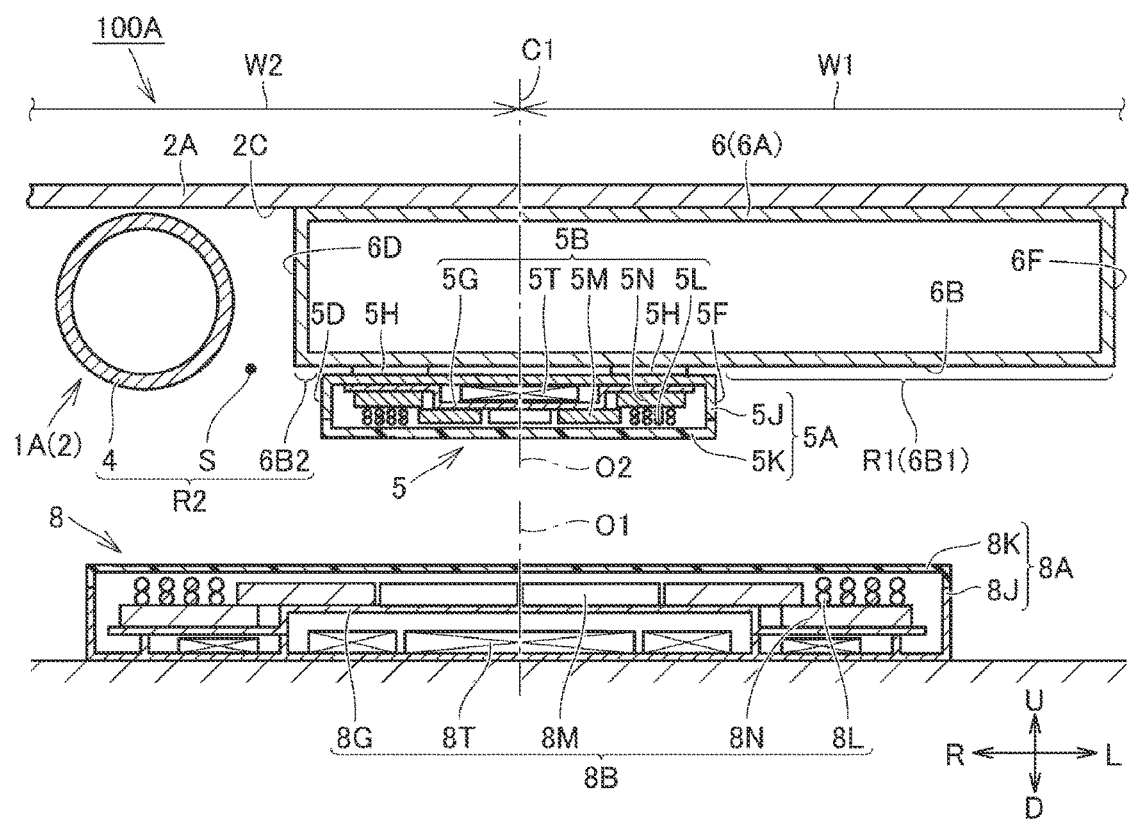
FIG. 9 is a sectional view taken along a line IX-IX in FIG. 8.

Referring now to FIGS. 8 to 12, a noncontact power transmission and reception system 100A (FIG. 9) and a vehicle 1A in Comparative Example 1 are described. FIG. 8 is a plan view illustrating the vehicle 1A (a vehicle body 2), and illustrates a state observed when a bottom surface 2C of the vehicle 1A is viewed from the lower side in the gravitational direction. FIG. 9 is a sectional view taken along a line IX-IX in FIG. 8. Embodiment 1 described above and Comparative Example 1 are different from each other in the following points.

In a case of Comparative Example 1, a winding axis O2 is placed at a position where the winding axis O2 accords with a central position C1 in the reference direction CD. A housing 5A is placed such that a central position of the housing 5A in the reference direction CD accords with the central position C1 of the vehicle body 2. A distance between the central position C1 and a side wall 5F of the housing 5A is equal to a distance between the central position C1 and a side wall 5D of the housing 5A.

A width of an exposed portion 6B2 is narrower in Comparative Example 1 than in Embodiment 1. A width of an exposed portion 6B1 is wider in Comparative Example 1 than in Embodiment 1. A second region R2 in Comparative Example 1 is also formed such that a magnetic permeability and an electric resistance thereof are higher than a magnetic permeability and an electric resistance of a first region R1, respectively, similarly to the second region R2 in Embodiment 1.

In Comparative Example 1 (FIG. 9), however, an exposed portion 6B1 is exposed widely above the power transmission coil 8L (8Lb), in comparison with Embodiment 1 (FIG. 5). An influence of reflection of the first region R1 to noncontact power transmission and reception is larger in Comparative Example 1 than in Embodiment 1. In the meantime, a relationship between a muffler 4 placed above the power transmission coil 8L (8La) and the power transmission coil 8L (8La) is hardly different between Comparative Example 1 and Embodiment 1.

The exposed portion 6B2 is narrower in Comparative Example 1 than in Embodiment 1. However, as a whole of the second region R2, the existence of the muffler 4 is dominant both in Comparative Example 1 and Embodiment 1. Accordingly, an influence of the second region R2 to noncontact power transmission and reception is hardly different between Comparative Example 1 and Embodiment 1.

Noncontact Power Transmission and Reception

Figure 10:
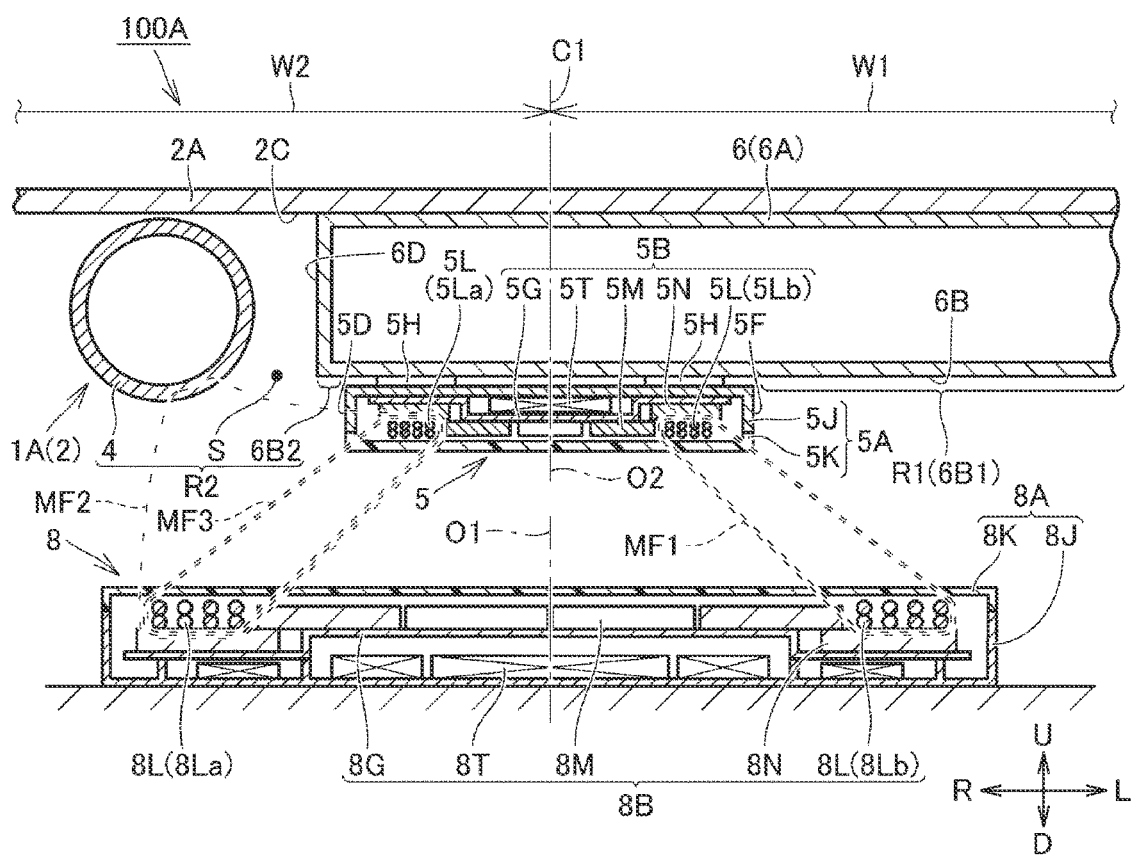
FIG. 10 is a sectional view illustrating a state where a power transmission apparatus 8 and a power reception apparatus 5 of the vehicle 1A perform power transmission and reception in a contactless manner in a state where the vehicle 1A in Comparative Example 1 is aligned in the parking space.

In the noncontact power transmission and reception system 100A, the noncontact power transmission and reception is performed between the power transmission apparatus 8 and a power reception apparatus 5 of the vehicle 1A. FIG. 10 is a sectional view illustrating a state where the power transmission apparatus 8 and the power reception apparatus 5 of the vehicle 1A perform power transmission and reception in a contactless manner in a state where the vehicle 1A is aligned in the parking space 9A (FIG. 1) (in other words, the central position C1 of the vehicle 1A, the winding axis O2 of a power receiving coil 5L, and the winding axis O1 of the power transmission coil 8L accord with each other).

Aligned State

As illustrated in FIG. 10, in Comparative Example 1, in a state where the power reception apparatus 5 and the power transmission apparatus 8 are aligned to each other (in a state where the central position C1 of the vehicle body 2 accords with the winding axis O1 of the power transmission coil 8L in the reference direction CD (FIG. 8)), the central position C1, the winding axis O2, and the winding axis O1 are placed at a position where they accord with each other. In the state where the power reception apparatus 5 and the power transmission apparatus 8 are aligned to each other, a distance between coil portions 5La and 8La is equal to a distance between coil portions 5Lb and 8Lb.

An amount of magnetic fluxes MF1 formed around the power transmission coil 8L (8Lb) and reflected by the first region R1 (the exposed portion 6B1) is larger in Comparative Example 1 than in Embodiment 1 (FIG. 5). An amount of magnetic fluxes MF1 formed around the power transmission coil 8L (8Lb) and crossing the power receiving coil 5L (5Lb) is smaller in Comparative Example 1 than in Embodiment 1 (FIG. 5).

An amount of magnetic fluxes MF3 formed around the power transmission coil 8L (8La) and reflected by the exposed portion 6B2 is smaller in Comparative Example 1 than in Embodiment 1 (FIG. 5). An amount of magnetic fluxes MF3 formed around the power transmission coil 8L (8La) and crossing the power receiving coil 5L (5La) is larger in Comparative Example 1 than in Embodiment 1 (FIG. 5). An amount of magnetic fluxes MF2 formed around the power transmission coil 8L (8La) and guided toward the power receiving coil 5L due to the existence of the lower part of the muffler 4 (the metal cover) so as to cross the power receiving coil 5L is larger in Comparative Example 1 than in Embodiment 1 (FIG. 5).

The amount of the magnetic fluxes MF1 is smaller in Comparative Example 1 than in Embodiment 1 (FIG. 5). However, in Comparative Example 1, the winding axis O2 accords with the winding axis O1, and as a whole of the noncontact power transmission and reception system 100A, a coupling coefficient between the power receiving coil 5L and the power transmission coil 8L is higher in Comparative Example 1 than in Embodiment 1.

It is desirable that the power transmission and reception be performed in a state where the alignment is performed sufficiently (the winding axes O1, O2 accord with each other) so that a high coupling coefficient is obtained. However, it is also assumed that, the vehicle 1A stops in a state where the vehicle 1A deviates from the power transmission apparatus 8, and because of that, the power transmission and reception is performed in a state where the winding axes O1, O2 deviate from each other.

Positional Deviation Toward Arrow L Side

Figure 11:
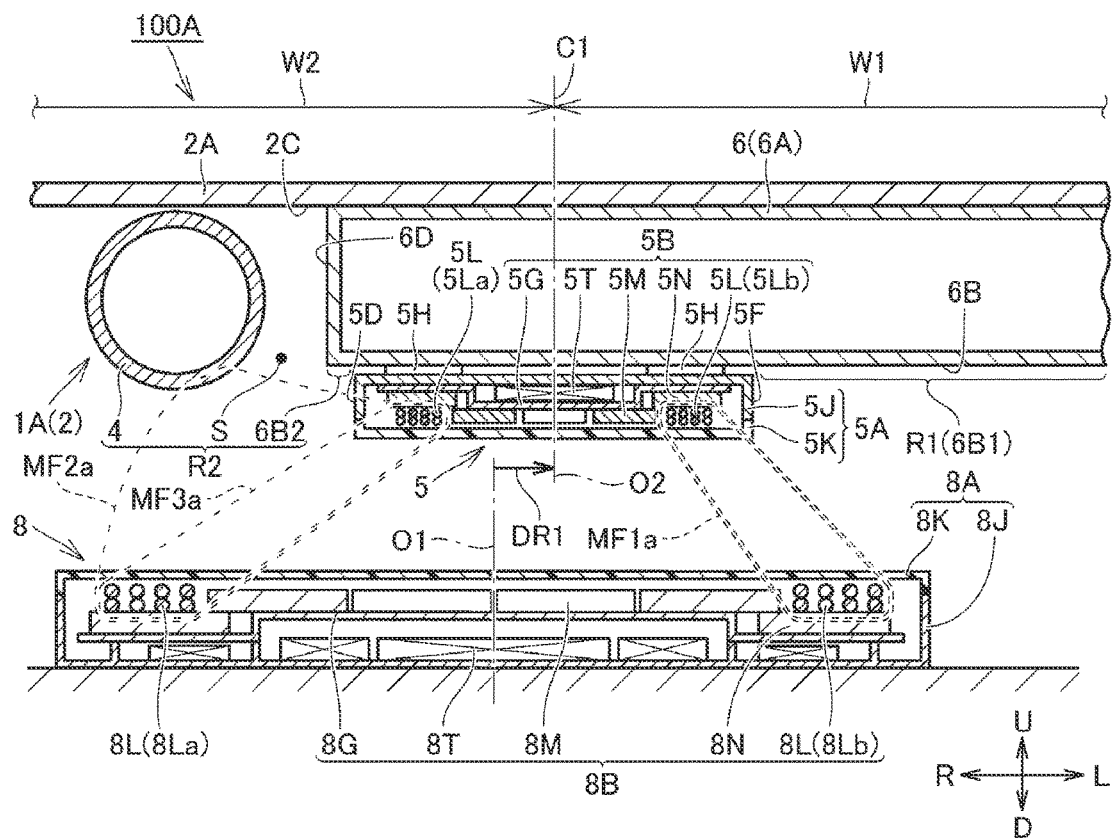
FIG. 11 is a sectional view illustrating a state where a power receiving coil 5L deviates from a power transmission coil 8L toward the arrow L side only by a distance DR1, from the state illustrated in FIG. 10.

FIG. 11 is a sectional view illustrating a state where the power receiving coil 5L deviates from the power transmission coil 8L toward the arrow L side only by a distance DR1, from the state illustrated in FIG. 10. When the power receiving coil 5L deviates from the power transmission coil 8L toward the arrow L side, the distance between the coil portions 5Lb and 8Lb is shorter than the case of FIG. 10, whereas the distance between the coil portions 5La and 8La is longer than the case of FIG. 10. The lower part of the muffler 4 (the metal cover) is positioned above the power transmission coil 8L (8La) (positioned inside the exterior shape of the coil portion 8La, in a plan view).

Among magnetic fluxes formed around the power transmission coil 8L (8Lb), an amount of magnetic fluxes reflected by the exposed portion 6B1 is decreased in comparison with the case of FIG. 10, and an amount of magnetic fluxes MF1a crossing the power receiving coil 5L (5Lb) is increased in comparison with the magnetic fluxes MF1 (FIG. 10). In the meantime, an amount of magnetic fluxes MF3a formed around the power transmission coil 8L (8La) and crossing the power receiving coil 5L (5La) is decreased in comparison with the magnetic fluxes MF3 (FIG. 10).

Some parts of magnetic fluxes MF2a formed around the power transmission coil 8L (8La) are guided by the metal cover of the muffler 4 so as to cross the power receiving coil 5L (5La). As a whole of the noncontact power transmission and reception system 100A, the amount of the magnetic fluxes MF3a is decreased in comparison with the magnetic fluxes MF3 (FIG. 10). However, the amount of the magnetic fluxes MF1a is increased in comparison with the magnetic fluxes MF1 (FIG. 10), and the magnetic fluxes MF2a that can cross the power receiving coil 5L (5La) exist, so that a coupling coefficient in the case of FIG. 11 is restrained from being greatly decreased from a coupling coefficient in the case of FIG. 10.

Positional Deviation Toward Arrow R Side

Figure 12:
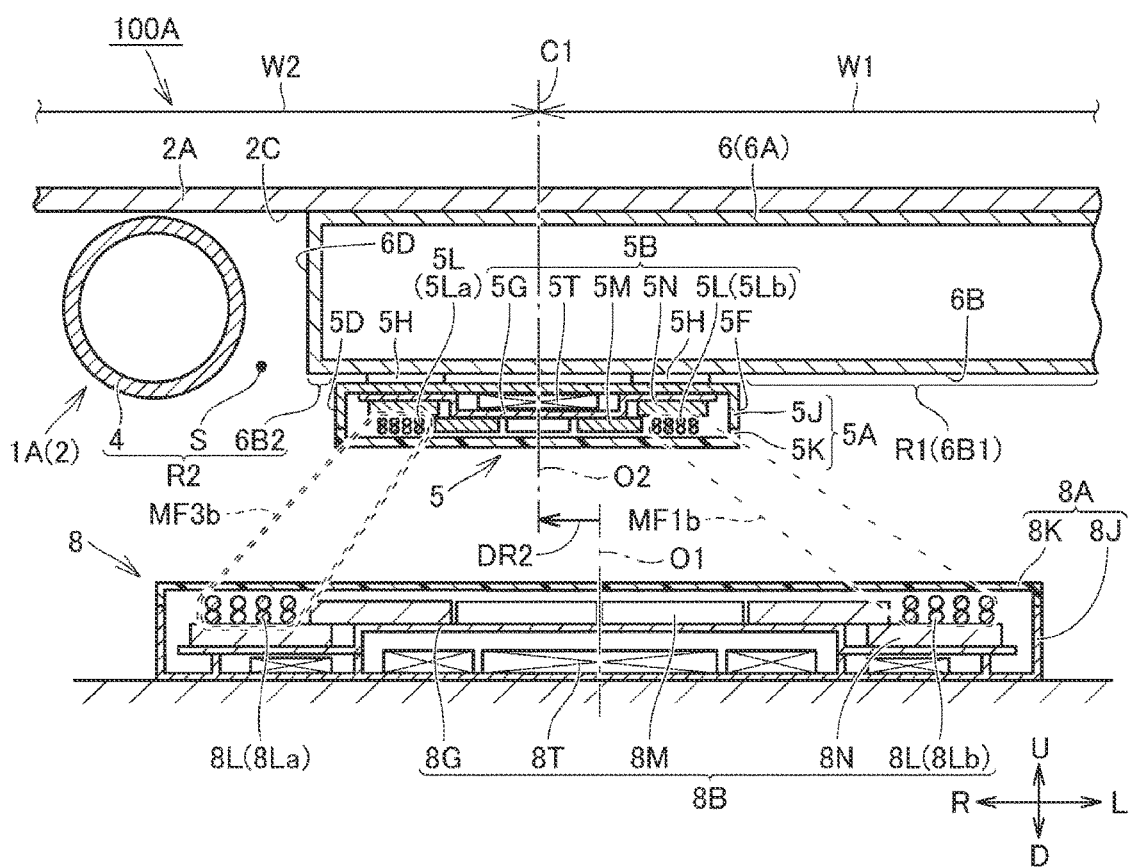
FIG. 12 is a sectional view illustrating a state where the power receiving coil 5L deviates from the power transmission coil 8L toward the arrow R side only by a distance DR2, from the state illustrated in FIG. 10.

FIG. 12 is a sectional view illustrating a state where the power receiving coil 5L deviates from the power transmission coil 8L toward the arrow R side only by a distance DR2, from the state illustrated in FIG. 10. The distance DR2 is generally the same as the distance DR1 (FIG. 11). When the power receiving coil 5L deviates from the power transmission coil 8L toward the arrow R side, the distance between the coil portions 5Lb and 8Lb is longer than the case of FIG. 10, whereas the distance between the coil portions 5La and 8La is shorter than the case of FIG. 10. Most of the lower part of the muffler 4 (the metal cover) is not positioned above the power transmission coal 8L (8La), and is positioned outside the exterior shape of the coil portion 8La, in a plan view.

Among magnetic fluxes formed around the power transmission coil 8L (8Lb), an amount of magnetic fluxes reflected by the exposed portion 6B1 is increased in comparison with the case of FIG. 10, and an amount of magnetic fluxes MF1b crossing the power receiving coil 5L (5Lb) is decreased in comparison with the magnetic fluxes MF1 (FIG. 10). In Comparative Example 1, the exposed portion 6B1 is exposed widely above the power transmission coil 8L (8Lb), in comparison with Embodiment 1 (FIG. 7). Accordingly, the amount of magnetic fluxes MF1b crossing the power receiving coil 5L (5Lb) is remarkably decreased in Comparative Example 1 in comparison with Embodiment 1.

An amount of magnetic fluxes MF3b formed around the power transmission coil 8L (8La) and crossing the power receiving coil 5L (5La) is increased in comparison with the magnetic fluxes MF3 (FIG. 10). Similarly to Embodiment 1 (FIG. 7), the magnetic fluxes formed around the power transmission coil 8L (8La) are hardly guided to the metal cover of the muffler 4.

Comparison Between Embodiment 1 and Comparative Example 1

A coupling coefficient obtained in a state where the alignment is performed in Embodiment 1 (a state (FIG. 5) where the winding axis O1 accords with the central position C1) is referred to as EX1, and a coupling coefficient obtained in a state where the alignment is performed in Comparative Example 1 (a state (FIG. 10) where the winding axis O1 accords with the winding axis O2) is referred to as CN1. CN1 is higher than EX1.

In Embodiment 1 and Comparative Example 1, respective coupling coefficients obtained when the power receiving coil 5L deviates from the power transmission coil 8L toward the arrow L side (FIG. 6, FIG. 11) are referred to as EX1L and CN1L. In Embodiment 1 and Comparative Example 1, respective coupling coefficients obtained when the power receiving coil 5L deviates from the power transmission coil 8L toward the arrow R side (FIG. 7, FIG. 12) are referred to as EX1R and CN1R.

A variation amount EXV of the coupling coefficient generated when a positional deviation occurs in Embodiment 1 is expressed as (EX1−EX1L)+(EX1−EX1R) and a variation amount CNV of the coupling coefficient generated when a positional deviation occurs in Comparative Example 1 is expressed as (CN1−CN1L)+(CN1−CN1R). Here, the variation amount CNV is larger than the variation amount EXV.

That is, in the noncontact power transmission and reception system 100 of Embodiment 1, the central position C1 and the winding axis O1 are intended to accord with each other, while the winding axis O2 does not accord with the central position C1, but the winding axis O2 is placed at a position offset from the central position C1 toward a side closer to the first region R1 having a lower magnetic permeability and a lower electric resistance than the second region R2 (that is, a side away from the second region R2 including the muffler 4).

In the noncontact power transmission and reception system 100A of Comparative Example 1, the central position C1 and the winding axes O1, O2 are intended to accord with each other. As a whole of the noncontact power transmission and reception systems 100, 100A, in terms of the second region R2, the existence of the muffler 4 is dominant both in Comparative Example 1 and Embodiment 1. Accordingly, an influence of the second region R2 to the noncontact power transmission and reception is hardly different between Comparative Example 1 and Embodiment 1. Meanwhile, in terms of the first region R1, an influence of reflection of the first region R1 to the noncontact power transmission and reception is larger in Comparative Example 1 than in Embodiment 1.

Accordingly, with the configuration of Embodiment 1, in a case where the regions (the first region R1 and the second region R2) having different magnetic permeabilities and different electric resistances are formed around the power reception apparatus 5, even if the power receiving coil 5L deviates from the power transmission coil 8L, the variation amount EXV is smaller than the variation amount CNV, so that it is possible to restrain variations in the coupling coefficient in comparison with Comparative Example 1, thereby making it possible to achieve noncontact charging efficiency with few variations with respect to the positional deviation.

Embodiment 2

Figure 13:
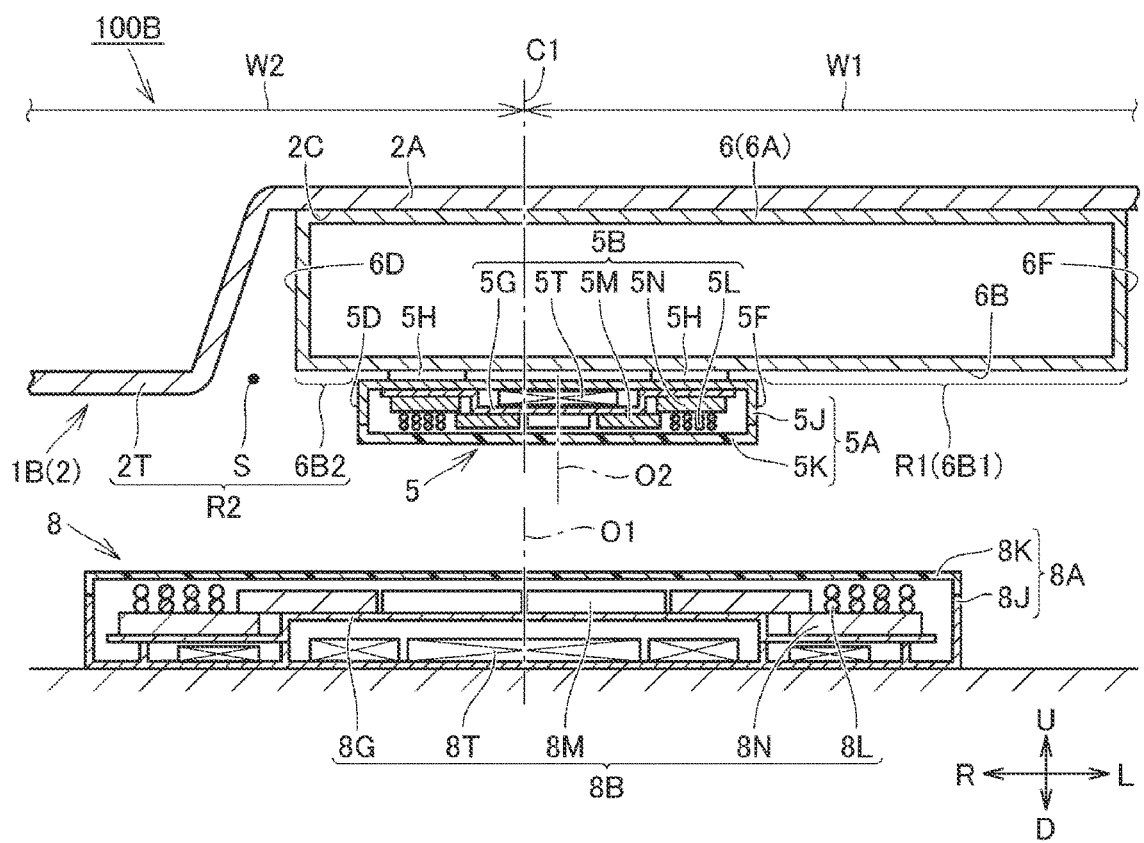
FIG. 13 is a sectional view illustrating a noncontact power transmission and reception system 100B and a vehicle 1B in Embodiment 2, and corresponds to FIG. 4 in Embodiment 1.

FIG. 13 is a sectional view illustrating a noncontact power transmission and reception system 100B and a vehicle 1B in Embodiment 2, and corresponds to FIG. 4 in Embodiment 1. Embodiments 1 and 2 are different from each other in the following points.

The vehicle 1 of Embodiment 1 includes the engine 3 and the muffler 4, and can function as a hybrid vehicle or a plug-in hybrid vehicle. The vehicle 1B of Embodiment 2 does not include an engine and a muffler, and can function as an electric vehicle. In the vehicle 1B, a projection portion 2T is provided on a bottom surface 2C side of a vehicle body 2 (a floor panel 2A) so that the projection portion 2T is adjacent to a power reception apparatus 5 in the vehicle width direction.

The projection portion 2T is constituted by a metal member mainly containing at least one of iron and stainless, for example. The projection portion 2T of the present embodiment is constituted by a member provided integrally with the floor panel 2A, as a part of the floor panel 2A. Alternatively, the projection portion 2T may be constituted by a structural member (a lower arm or a frame) other than the floor panel 2A in the vehicle body 2.

Similarly to Embodiment 1, a second region R2 including such a projection portion 2T is positioned on the other side (the arrow R side) in the reference direction CD (see FIG. 3 and so on) relative to a housing 5A of the power reception apparatus 5, and is formed such that a magnetic permeability and an electric resistance of the second region R2 are higher than a magnetic permeability and an electric resistance of a first region R1, respectively. Even with the vehicle 1B and the noncontact power transmission and reception system 100B configured as described above, the projection portion 2T gives an action similar to the muffler 4 to noncontact power transmission and reception, so that it is possible to obtain an operation and an effect similar to Embodiment 1.

Embodiment 3

Figure 14:
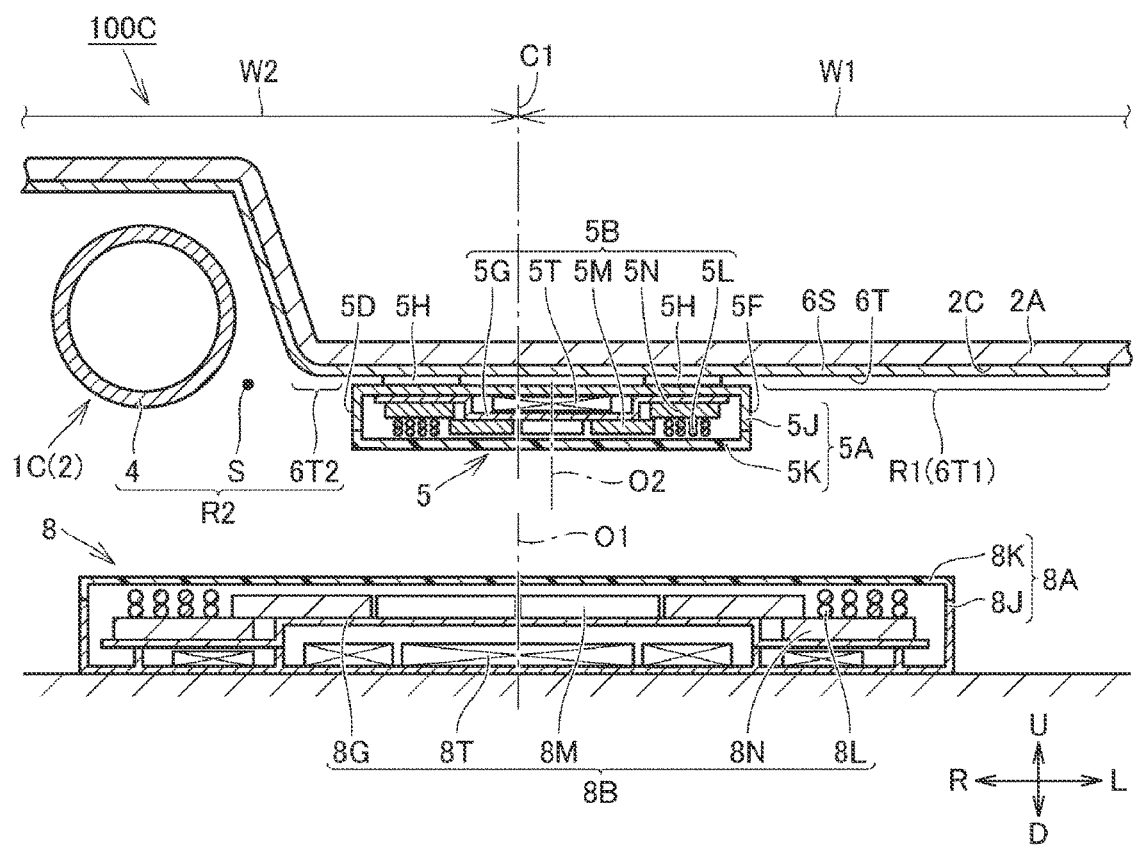
FIG. 14 is a sectional view illustrating a noncontact power transmission and reception system 100C and a vehicle 1C in Embodiment 3, and corresponds to FIG. 4 in Embodiment 1.

FIG. 14 is a sectional view illustrating a noncontact power transmission and reception system 100C and a vehicle 1C in Embodiment 3, and corresponds to FIG. 4 in Embodiment 1. Embodiments 1 and 3 are different from each other in the following points.

In the vehicle 1 of Embodiment 1, the power reception apparatus 5 is fixed to the bottom surface 2C side of the vehicle body 2 (the floor panel 2A) via the power storage apparatus 6. In the vehicle 1C of Embodiment 3, a power reception apparatus 5 is fixed to a bottom surface 2C side of a vehicle body 2 (a floor panel 2A) via a metal plate 6S. A power storage apparatus 6 may be placed on the bottom surface 2C side of the vehicle body 2 (the floor panel 2A) or may be provided inside the vehicle body 2 (on a top side of the floor panel 2A), as needed.

The metal plate 6S is constituted by a member made of aluminum, for example. A bottom surface 6T of the metal plate 6S functions similarly to the bottom surface 6B of the power storage apparatus 6 of Embodiment 1, with respect to noncontact power transmission and reception. An exposed portion 6T1 functions similarly to the exposed portion 6B1 of Embodiment 1, and an exposed portion 6T2 functions similarly to the exposed portion 6B2 of Embodiment 1.

Also in terms of a first region R1 including such an exposed portion 6T1 and a second region R2 including such an exposed portion 6T2, the second region R2 is formed such that a magnetic permeability and an electric resistance thereof are higher than a magnetic permeability and an electric resistance of the first region R1, respectively. Even with the vehicle 1C and the noncontact power transmission and reception system 100C configured as described above, the exposed portions 6T1, 6T2 give actions similar to the exposed portions 6B1, 6B2 to noncontact power transmission and reception, so that it is possible to obtain an operation and an effect similar to those in Embodiment 1.

Modifications of Embodiments 1 to 3

In Embodiments 1 to 3, the space S is included as a constituent of the second region R2. The space S is not an essential constituent. For example, in the configuration of Embodiment 1 or Embodiment 3 (FIG. 14), a heat insulation material may be provided between the power reception apparatus 5 and the muffler 4 so as to bury the space therebetween. In the configuration of Embodiment 2 (FIG. 13), the projection portion 2T may make contact with the body case 6A of the power storage apparatus 6.

Even in a case where the second region R2 does not include the space S as the constituent, when the second region R2 is formed such that the magnetic permeability and the electric resistance thereof are higher than the magnetic permeability and the electric resistance of the first region R1, respectively, it is possible to obtain operations and effects similar to those in Embodiments 1 to 3.

Embodiment 4

Figure 15:
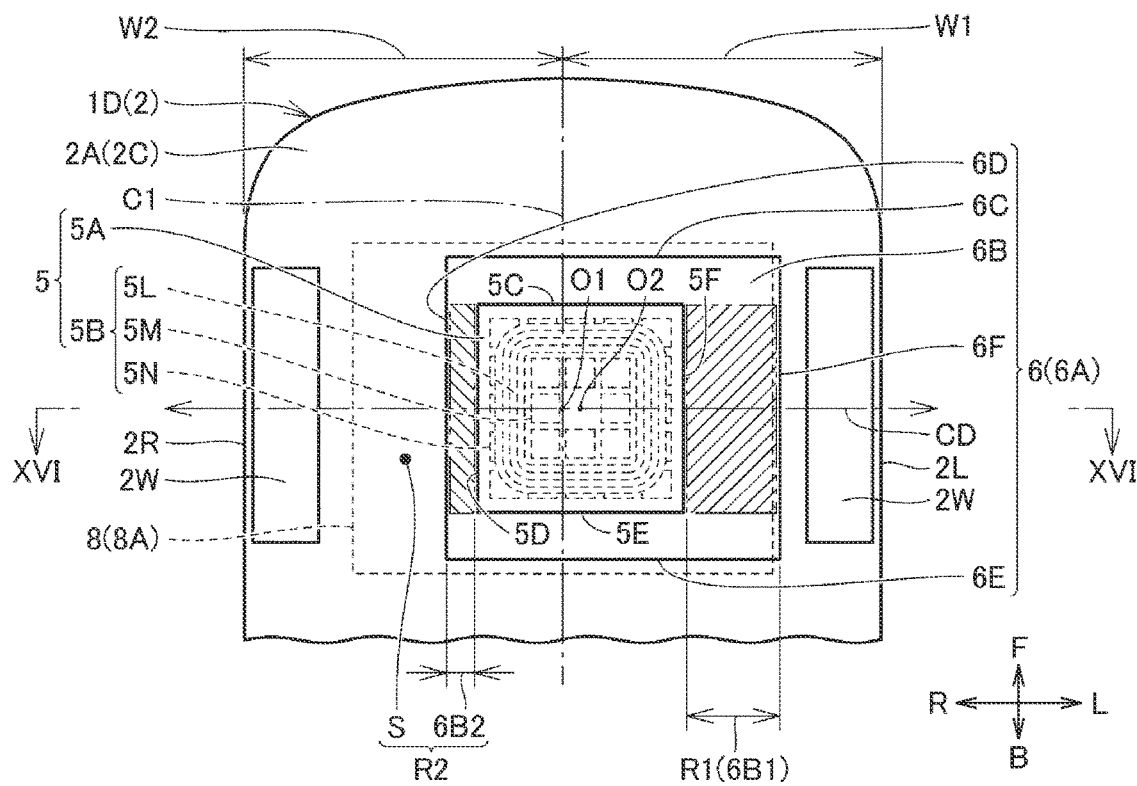
FIG. 15 is a plan view illustrating a floor panel 2A of a vehicle 1D (a vehicle body 2) in a noncontact power transmission and reception system 100D in Embodiment 4, and a power reception apparatus 5, a power storage apparatus 6, and the like provided on a bottom surface 2C side of the floor panel 2A, and illustrates a state observed when the bottom surface 2C of the vehicle 1D is viewed from the lower side in the gravitational direction.
Figure 16:
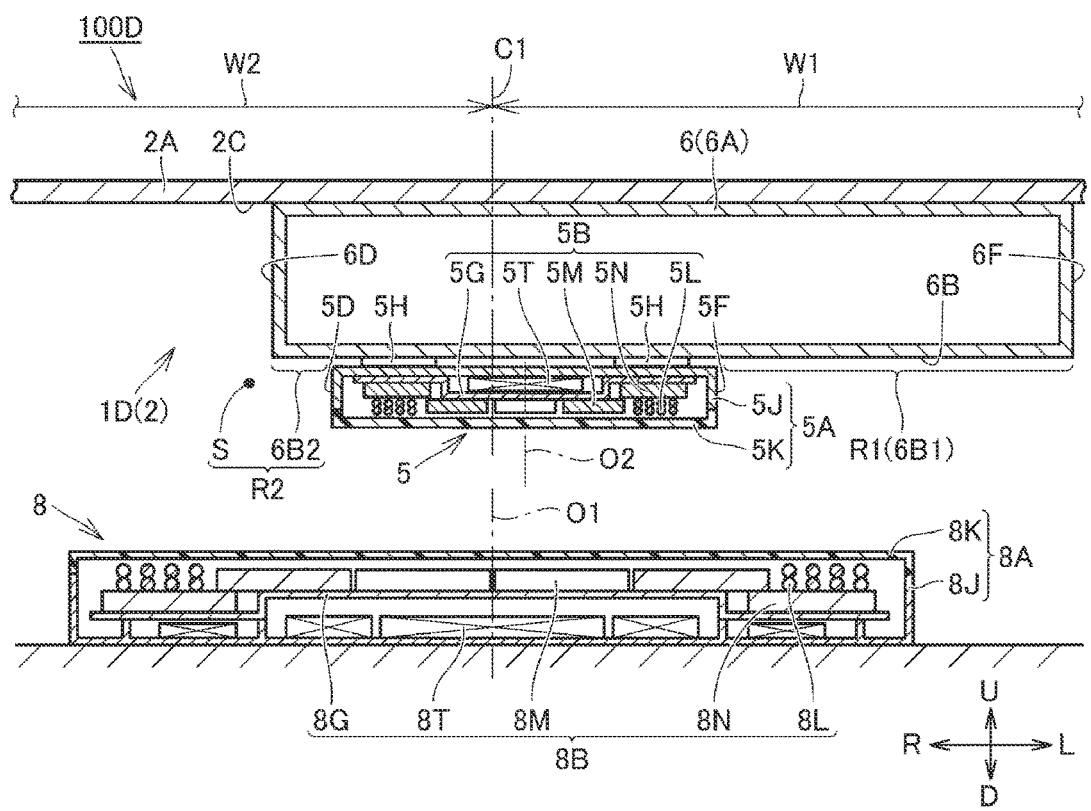
FIG. 16 is a sectional view taken along an arrow XVI-XVI in FIG. 15.

Referring now to FIGS. 15 to 19, the following describes a vehicle 1D and a noncontact power transmission and reception system 100D in Embodiment 4. FIG. 15 is a plan view illustrating a floor panel 2A of the vehicle 1D (a vehicle body 2) in the noncontact power transmission and reception system 100D, and a power reception apparatus 5, a power storage apparatus 6, and the like provided on a bottom surface 2C side of the floor panel 2A, and illustrates a state observed when the bottom surface 2C of the vehicle 1D is viewed from the lower side in the gravitational direction. FIG. 16 is a sectional view taken along an arrow XVI-XVI in FIG. 15. Embodiments 1 and 4 are different from each other in the following points.

The vehicle 1D of Embodiment 4 does not include an engine and a muffler, and can function as an electric vehicle. The power reception apparatus 5 and the power storage apparatus 6 are placed between wheel assemblies 2W, 2W (two front wheels). The power reception apparatus 5 and the power storage, apparatus 6 may be placed between two rear wheels (not shown). A space S is provided on the arrow R side relative to a side wall 5D of the power reception apparatus 5 and on the arrow R side relative to a side wall 6D of the power storage apparatus 6.

A second region R2 includes the space S and an exposed portion 6B2, but does not include a muffler as a constituent. The space S and the exposed portion 6B2 constituting the second region R2 are, as a whole, positioned on the other side (a side closer to a side surface 2R) in the reference direction CD relative to a housing 5A of the power reception apparatus 5, and is formed such that a magnetic permeability and an electric resistance of the second region R2 are higher than a magnetic permeability and an electric resistance of a first region R1, respectively.

Noncontact Power Transmission and Reception

Figure 17:
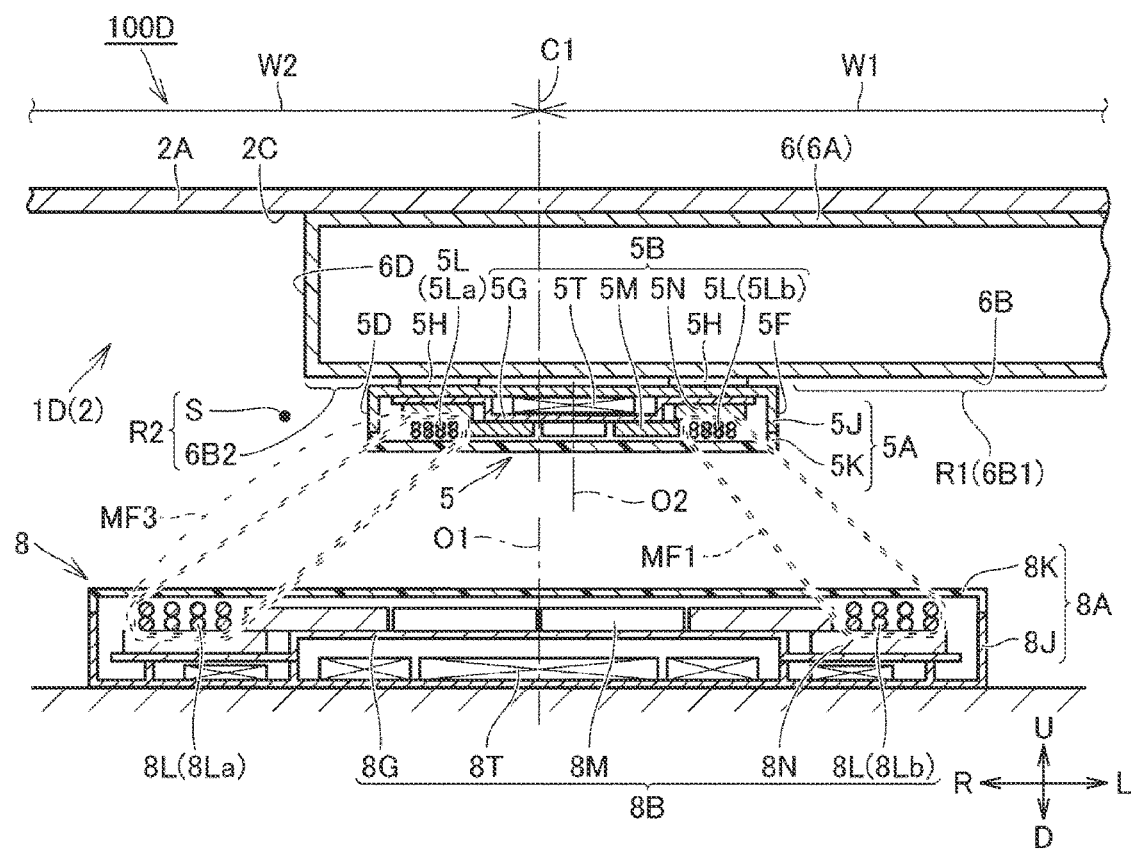
FIG. 17 is a sectional view illustrating a state where a power transmission apparatus 8 and the power reception apparatus 5 of the vehicle 1D perform power transmission and reception in a contactless manner in a state where the vehicle 1D in Embodiment 4 is aligned in the parking space.

In the noncontact power transmission and reception system 100D, noncontact power transmission and reception is performed between the power transmission apparatus 8 and the power reception apparatus 5 of the vehicle 1D. FIG. 17 is a sectional view illustrating a state where the power transmission apparatus 8 and the power reception apparatus 5 of the vehicle 1D perform power transmission and reception in a contactless manner in a state where the vehicle 1D is aligned in the parking space 9A (see FIG. 1) (in other words, a central position C1 of the vehicle 1D accords with the winding axis O1 of the power transmission coil 8L).

Aligned State

As illustrated in FIG. 17, in the present embodiment, in a state where the power reception apparatus 5 and the power transmission apparatus 8 are aligned to each other (in a state where the central position C1 of the vehicle body 2 accords with the winding axis O1 of the power transmission coil 8L in the reference direction CD (FIG. 15)), the winding axis O2 of the power receiving coil 5L is placed at a position deviating from the central position C1 of the vehicle body 2 toward the one side (the arrow L side) in the reference direction CD.

Magnetic fluxes MF1 formed around the power transmission coil 8L (8Lb) cross the power receiving coil 5L (5Lb), similarly to Embodiment 1. Magnetic fluxes MF3 formed around the power transmission coil 8L (8La) pass through the space S and cross the power receiving coil 5L (5La) without being affected by the muffler, unlike Embodiment 1.

Positional Deviation Toward Arrow L Side

Figure 18:
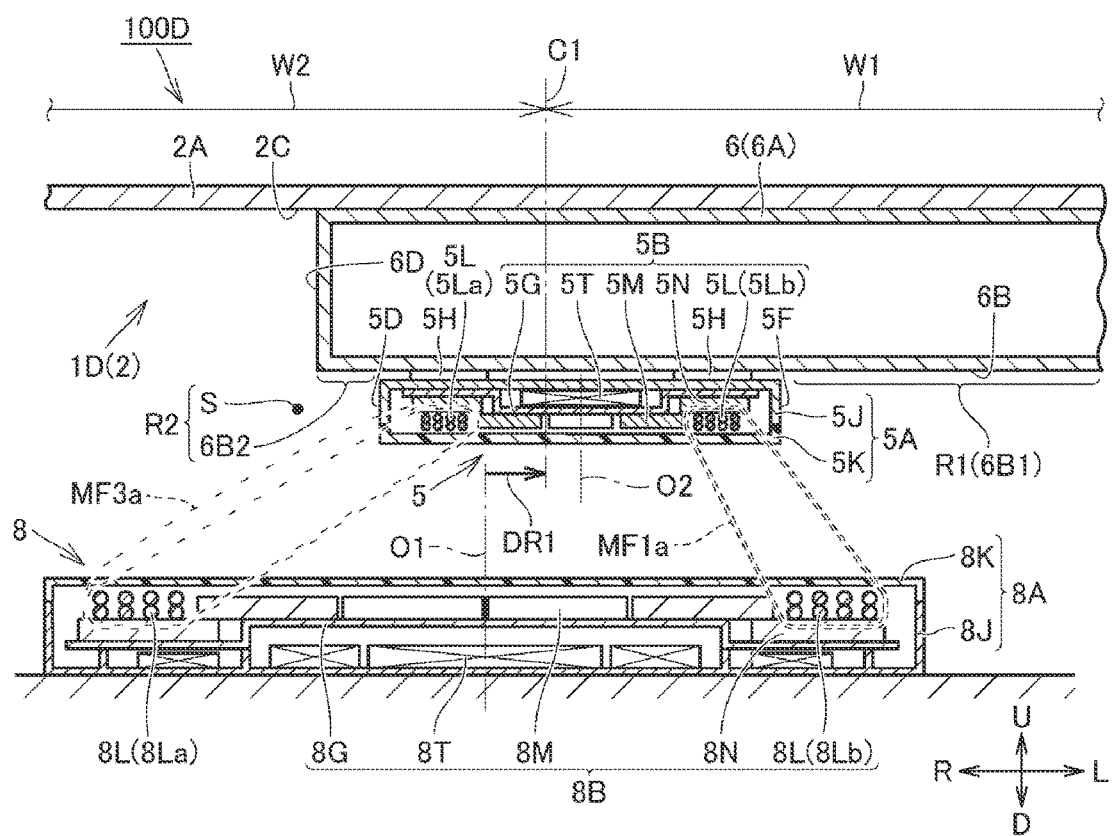
FIG. 18 is a sectional view illustrating a state where a power receiving coil 5L deviates from a power transmission coil 8L toward the arrow L side only by a distance DR1, from the state illustrated in FIG. 17.

FIG. 18 is a sectional view illustrating a state where the power receiving coil 5L deviates from the power transmission coil 8L toward the arrow L side only by a distance DR1, from the state illustrated in FIG. 17. Among magnetic fluxes formed around the power transmission coil 8L (8Lb), an amount of magnetic fluxes reflected by the exposed portion 6B1 is decreased in comparison with the case of FIG. 17, and an amount of magnetic fluxes MF1a crossing the power receiving coil 5L (5Lb) is increased in comparison with the magnetic fluxes MF1 (FIG. 17). In the meantime, an amount of magnetic fluxes MF3a formed around the power transmission coil 8L (8La) and crossing the power receiving coil 5L (5La) is decreased in comparison with the magnetic fluxes MF3 (FIG. 17).

Positional Deviation Toward Arrow R Side

Figure 19:
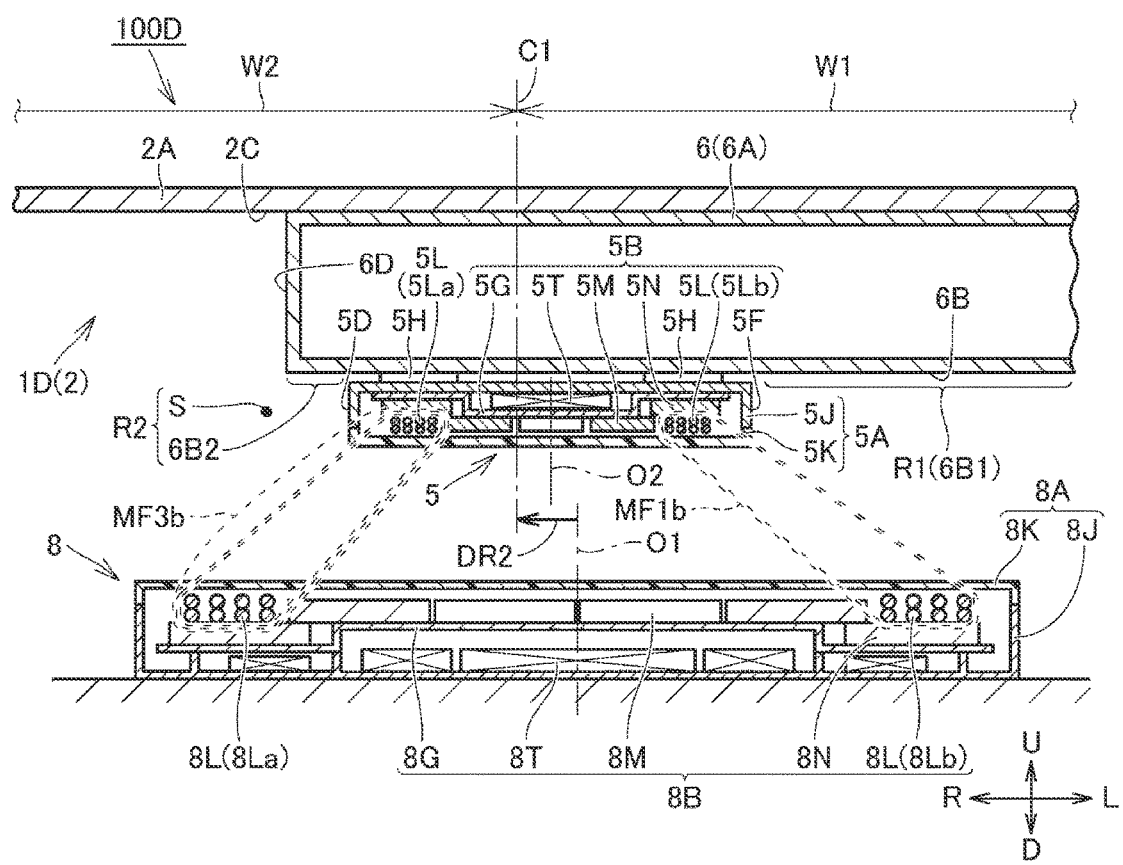
FIG. 19 is a sectional view illustrating a state where the power receiving coil 5L deviates from a power transmission coil 8L toward the arrow R side only by a distance DR2, from the state illustrated in FIG. 17.

FIG. 19 is a sectional view illustrating a state where the power receiving coil 5L deviates from the power transmission coil 8L toward the arrow R side only by a distance DR2, from the state illustrated in FIG. 17. The distance DR2 is generally the same as the distance DR1 (FIG. 18). The space S is positioned above the power transmission coil 8L (8La).

Among magnetic fluxes formed around the power transmission coil 8L (8Lb), an amount of magnetic fluxes reflected by the exposed portion 6B1 is increased in comparison with the case of FIG. 17, and an amount of magnetic fluxes MF1b crossing the power receiving coil 5L (5Lb) is decreased in comparison with the magnetic fluxes MF1 (FIG. 17). In the meantime, an amount of magnetic fluxes MF3b formed around the power transmission coil 8L (8La) and crossing the power receiving coil 5L (5La) is increased in comparison with the magnetic fluxes MF3 (FIG. 17).

In the present embodiment, as described above, the regions (the first region R1 and the second region R2) having different magnetic permeabilities and different electric resistances are formed around the power reception apparatus 5, and in a state where the power reception apparatus 5 and the power transmission apparatus 8 are aligned to each other (in a state where the central position C1 of the vehicle body 2 accords with the winding axis O1 of the power transmission coil 8L in the reference direction CD (FIG. 15)), the winding axis O2 of the power receiving coil 5L is placed at a position deviating from the central position C1 (and the winding axis O1) of the vehicle body 2 toward the one side (the arrow L side) in the reference direction CD.

With the above configuration, even if the power receiving coil 5L deviates from the power transmission coil 8L toward the arrow L side (FIG. 18), or even if the power receiving coil 5L deviates from the power transmission coil 8L toward the arrow R side (FIG. 19), it is possible to restrain variations in a coupling coefficient between the power receiving coil 5L and the power transmission coil 8L, thereby making it possible to achieve noncontact charging efficiency with few variations with respect to a positional deviation. A principle that such an operation and an effect are obtained with the configuration will be described below while comparing Comparative Example 2 with Embodiment 4.

Comparative Example 2

Figure 20:
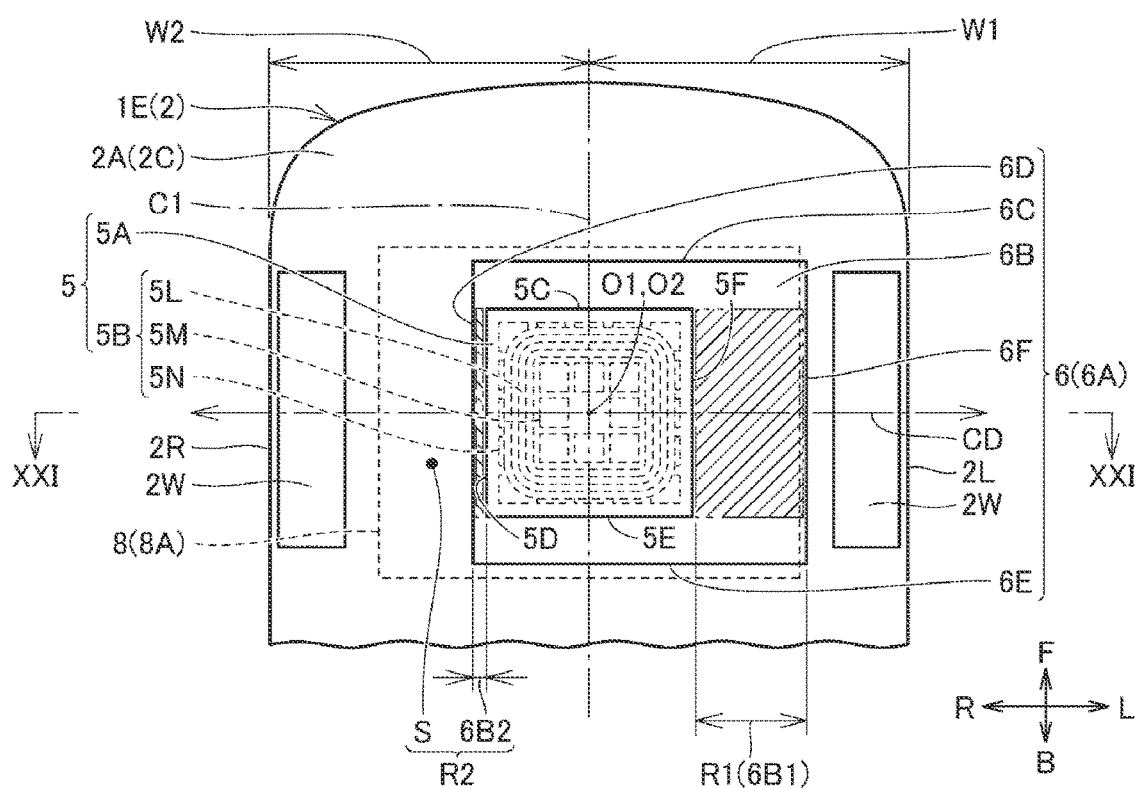
FIG. 20 is a plan view illustrating a vehicle 1E (a vehicle body 2) in Comparative Example 2, and illustrates a state observed when a bottom surface 2C of the vehicle 1E is viewed from the lower side in the gravitational direction.
Figure 21:
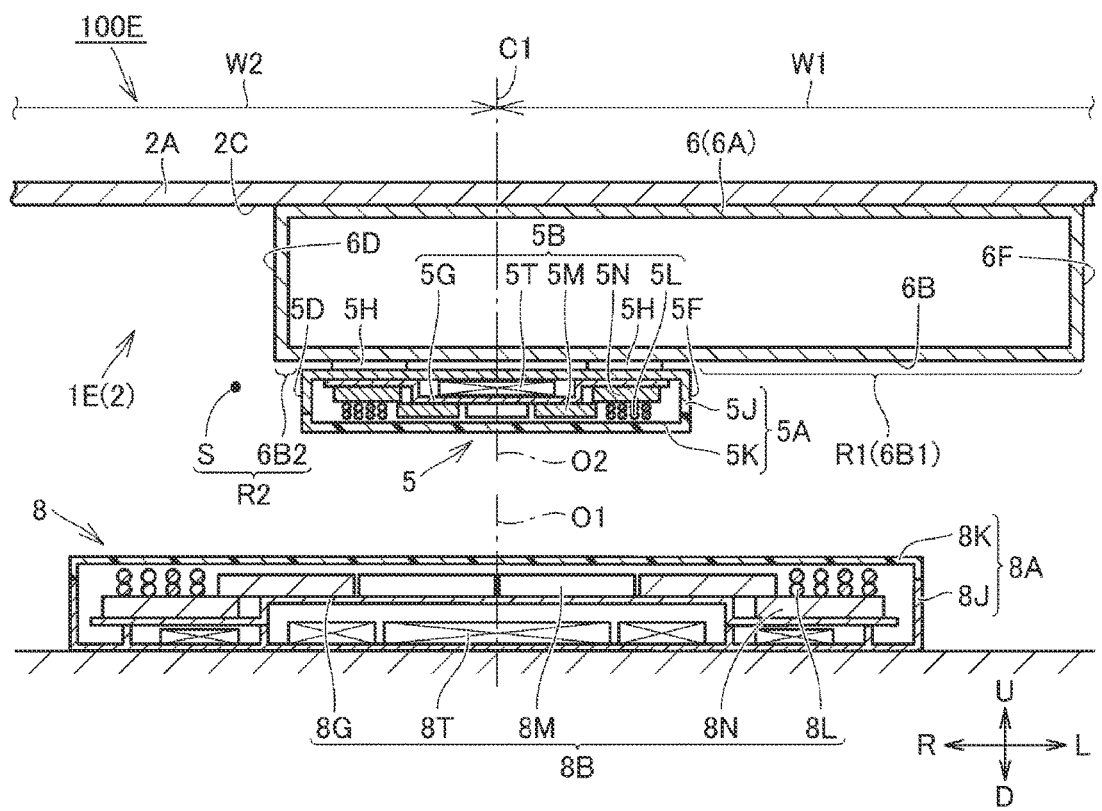
FIG. 21 is a sectional view taken along an arrow XXI-XXI in FIG. 20.

Referring now to FIGS. 20 to 24, a noncontact power transmission and reception system 100E (FIG. 21) and a vehicle 1E in Comparative Example 2 are described. FIG. 20 is a plan view illustrating the vehicle 1E (a vehicle body 2), and illustrates a state observed when a bottom surface 2C of the vehicle 1E is viewed from the lower side in the gravitational direction. FIG. 21 is a sectional view taken along an arrow XXI-XXI in FIG. 20. Embodiment 4 described above and Comparative Example 2 are different from each other in the following points.

In a case of Comparative Example 2, a winding axis O2 is placed at a position where the winding axis O2 accords with a central position C1 in the reference direction CD. A housing 5A is placed such that a central position of the housing 5A in the reference direction CD accords with the central position C1 of the vehicle body 2. A width of an exposed portion 6B2 is narrower in Comparative Example 2 than that in Embodiment 4. A width of an exposed portion 6B1 is wider in Comparative Example 2 than in Embodiment 4. A second region R2 in Comparative Example 2 is also formed such that a magnetic permeability and an electric resistance thereof are higher than a magnetic permeability and an electric resistance of a first region R1, respectively, similarly to the second region R2 in Embodiment 4.

In Comparative Example 4 (FIG. 21), however, the exposed portion 6B1 is exposed widely above the power transmission coil 8L (8Lb), in comparison with Embodiment 4 (FIG. 16). An influence of reflection of the first region R1 to noncontact power transmission and reception is larger in Comparative Example 2 than Embodiment 4. In the meantime, a relationship between the space S positioned above the power transmission coil 8L (8La) and the power transmission coil 8L (8La) is hardly different between Comparative Example 2 and Embodiment 4.

The exposed portion 6B2 is narrower in Comparative Example 2 than in Embodiment 4. However, as a whole of the second region R2, the existence of the space S is dominant both in Comparative Example 2 and Embodiment 4. Accordingly, an influence of the second region R2 to the noncontact power transmission and reception is hardly different between Comparative Example 2 and Embodiment 4.

Noncontact Power Transmission and Reception

Figure 22:
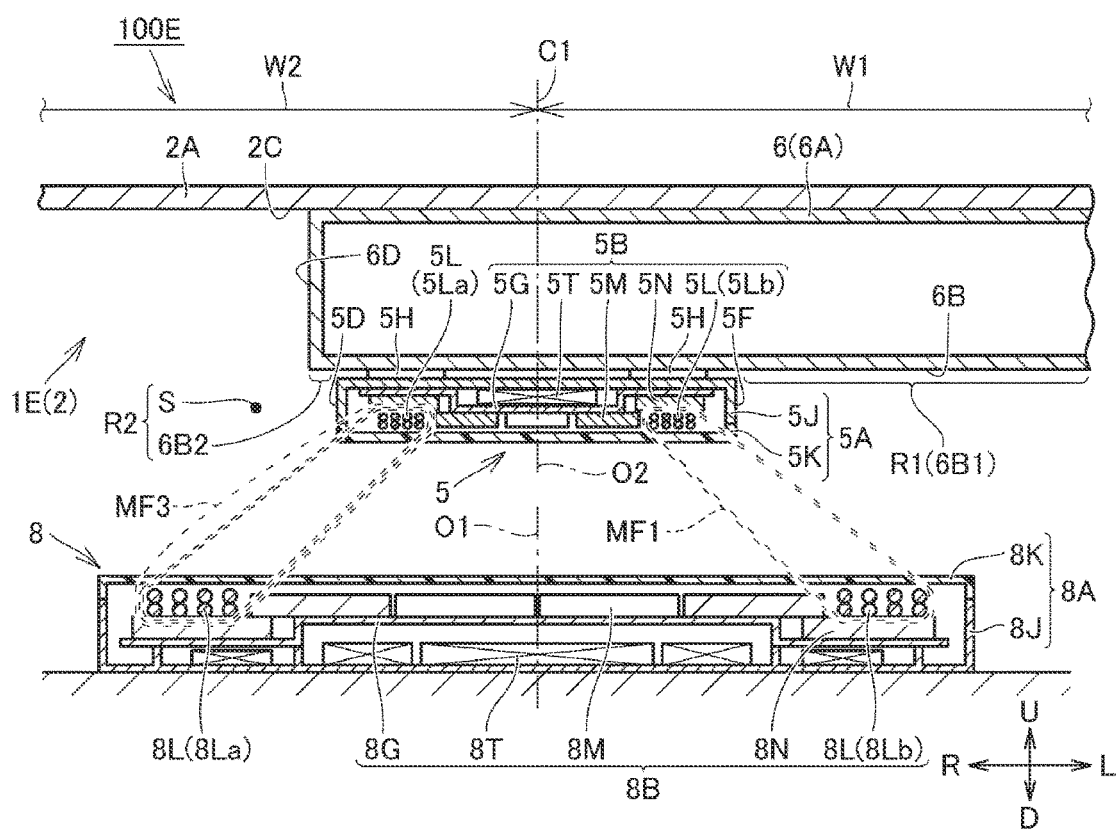
FIG. 22 is a sectional view illustrating a state where a power transmission apparatus 8 and a power reception apparatus 5 of the vehicle 1E perform power transmission and reception in a contactless manner in a state where the vehicle 1E in Comparative Example 2 is aligned in the parking space.

In the noncontact power transmission and reception system 100E, noncontact power transmission and reception is performed between the power transmission apparatus 8 and the power reception apparatus 5 of the vehicle 1E. FIG. 22 is a sectional view illustrating a state where the power transmission apparatus 8 and the power reception apparatus 5 of the vehicle 1E perform power transmission and reception in a contactless manner in a state where the vehicle 1E is aligned in the parking space 9A (FIG. 1) (in other words, a central position C1 of the vehicle 1E, a winding axis O2 of a power receiving coil 5L, and the winding axis O1 of the power transmission coil 8L accord with each other).

Aligned State

As illustrated in FIG. 22, in Comparative Example 2, in a state where the power reception apparatus 5 and the power transmission apparatus 8 are aligned to each other (in a state where the central position C1 of the vehicle body 2 accords with the winding axis O1 of the power transmission coil 8L in the reference direction CD (FIG. 20)), the central position C1, the winding axis O2, and the winding axis O1 are placed at a position where they accord with each other. In a state where the power reception apparatus 5 and the power transmission apparatus 8 are aligned to each other, a distance between coil portions 5La and 8La is equal to a distance between coil portions 5Lb and 8Lb.

An amount of magnetic fluxes MF1 formed around the power transmission coil 8L (8Lb) and reflected by the first region R1 (the exposed portion 6B1) is larger in Comparative Example 2 than in Embodiment 4 (FIG. 17). An amount of magnetic fluxes formed around the power transmission coil 8L (8Lb) and crossing the power receiving coil 5L (5Lb) is smaller in Comparative Example 2 than in Embodiment 4 (FIG. 17).

An amount of magnetic fluxes MF3 formed around the power transmission coil 8L (8La) and reflected by the exposed portion 6B2 is smaller in Comparative Example 2 than in Embodiment 4 (FIG. 17). An amount of magnetic fluxes MF3 formed around the power transmission coil 8L (8La) and crossing the power receiving coil 5L (5La) is larger in Comparative Example 2 than in Embodiment 4 (FIG. 17).

The amount of the magnetic fluxes MF1 is smaller in Comparative Example 2 than in Embodiment 4 (FIG. 17). However, in Comparative Example 2, the winding axis O2 accords with, the winding axis O1, and as a whole of the noncontact power transmission and reception system 100E, a coupling coefficient between the power receiving coil 5L and the power transmission coil 8L is higher in Comparative Example 2 than in Embodiment 4.

It is desirable that power transmission and reception be performed in a state where the alignment is performed sufficiently (the winding axes O1, O2 accord with each other) so that a high coupling coefficient is obtained. However, it is also assumed that the vehicle 1E stops in a state where the vehicle 1E deviates from the power transmission apparatus 8, and because of that, the power transmission and reception is performed in a state where the winding axes O1, O2 deviate from each other.

Positional Deviation Toward Arrow L Side

Figure 23:
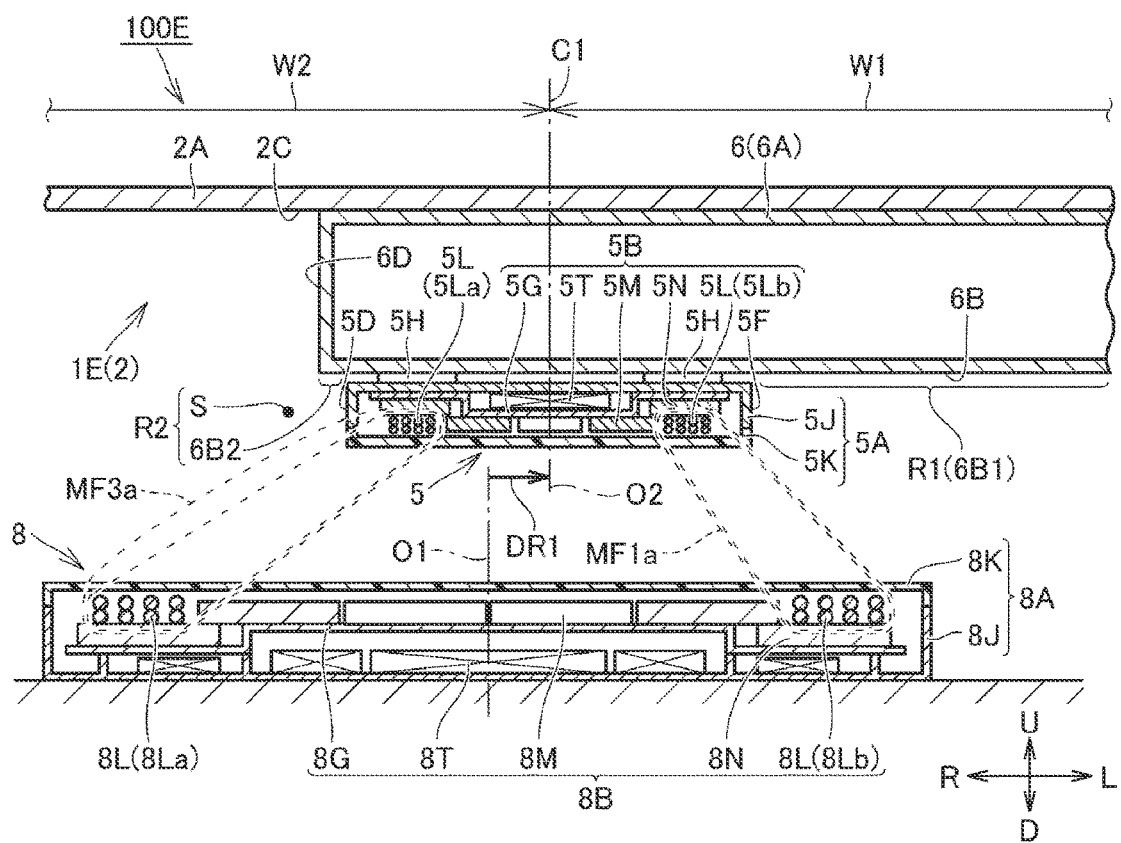
FIG. 23 is a sectional view illustrating a state where a power receiving, coil 5L deviates from a power transmission coil 8L toward the arrow L side only by a distance DR1, from the state illustrated in FIG. 22.

FIG. 23 is a sectional view illustrating a state where the power receiving coil 5L deviates from the power transmission coil 8L toward the arrow L side only by a distance DR1, from the state illustrated in FIG. 22. Among magnetic fluxes formed around the power transmission coil 8L (8Lb), an amount of magnetic fluxes reflected by the exposed portion 6B1 is decreased in comparison with the case of FIG. 22, and an amount of magnetic fluxes MF1$a$ crossing the power receiving coil 5L (5Lb) is increased in comparison with the magnetic fluxes MF1 (FIG. 22). In the meantime, an amount of magnetic fluxes MF3$a$ formed around the power transmission coil 8L (8La) and crossing the power receiving coil 5L (5La) is decreased in comparison with the magnetic fluxes MF3 (FIG. 22).

Positional Deviation Toward Arrow R Side

Figure 24:
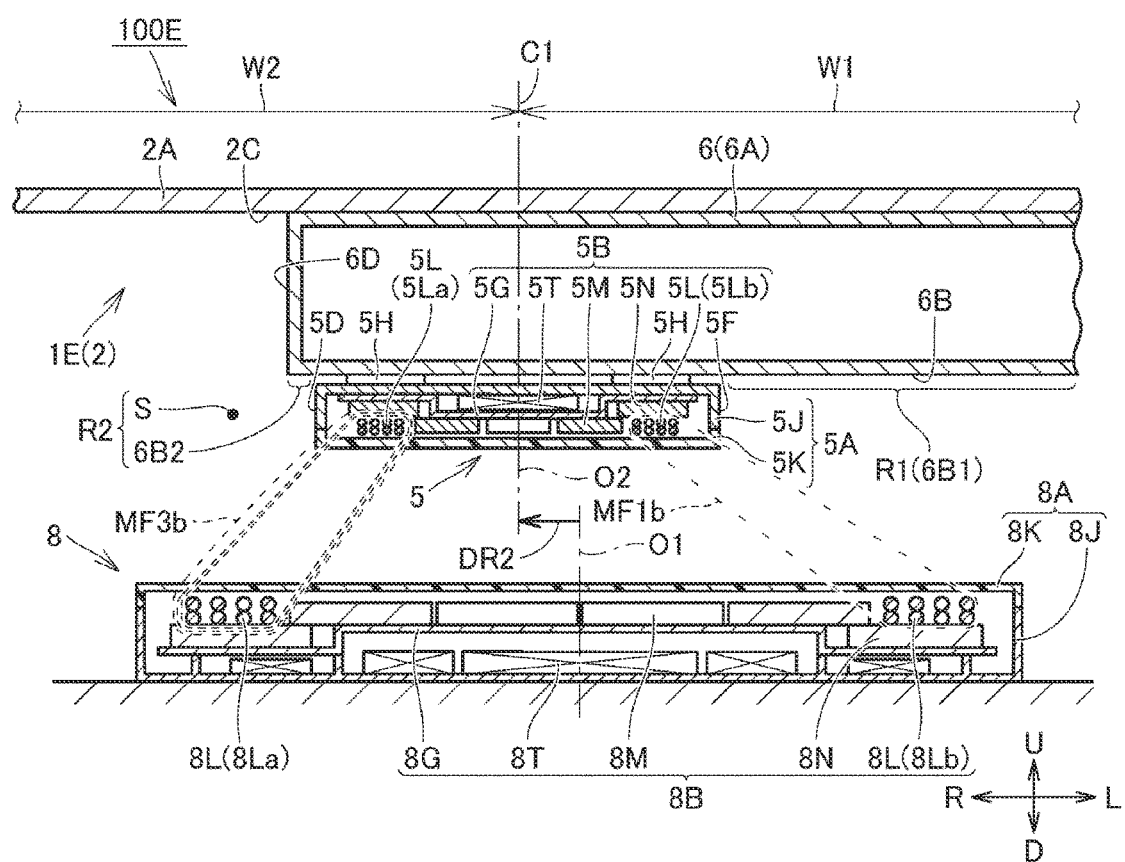
FIG. 24 is a sectional view illustrating a state where the power receiving coil 5L deviates from the power transmission coil 8L toward the arrow R side only by a distance DR2, from the state illustrated in FIG. 22.

FIG. 24 is a sectional view illustrating a state where the power receiving coil 5L deviates from the power transmission coil 8L toward the arrow R side only by a distance DR2, from the state illustrated in FIG. 22. The distance DR2 is generally the same as the distance DR1 (FIG. 23). The space S is placed above the power transmission coil 8L (8La).

Among magnetic fluxes formed around the power transmission coil 8L (8Lb), an amount of magnetic fluxes reflected by the exposed portion 6B1 is increased in comparison with the case of FIG. 22, and an amount of magnetic fluxes MF1$b$ crossing the power receiving coil 5L (5Lb) is decreased in comparison with the magnetic fluxes MF1 (FIG. 22). In Comparative Example 2, the exposed portion 6B1 is exposed widely above the power transmission coil 8L (8Lb), in comparison with Embodiment 4 (FIG. 19). Accordingly, the amount of magnetic fluxes MF1$b$ crossing the power receiving coil 5L (5Lb) is remarkably decreased in Comparative Example 2 in comparison with Embodiment 4. An amount of magnetic fluxes MF3$b$ formed around the power transmission coil 8L (8La) and crossing the power receiving coil 5L (5La) is increased in comparison with the magnetic fluxes MF3 (FIG. 22).

Comparison Between Embodiment 4 and Comparative Example 2

A coupling coefficient obtained in a state where the alignment is performed in Embodiment 4 (a state (FIG. 16) where the winding axis O1 accords with the central position C1) is referred to as EX1, and a coupling coefficient obtained in a state where the alignment is performed in Comparative Example 2 (a state FIG. 22) where the winding axis O1 accords with the winding axis O2) is referred to as CN1. CN1 is higher than EX1.

In Embodiment 4 and Comparative Example 2, respective coupling coefficients obtained when the power receiving coil 5L deviates from the power transmission coil 8L toward the arrow L side (FIG. 18, FIG. 23) are referred to as EX1L and CN1L. In Embodiment 4 and Comparative Example 2, respective coupling coefficients obtained when the power receiving coil 5L deviates from the power transmission coil 8L toward the arrow R side (FIG. 19, FIG. 24) are referred to as EX1R and CN1R.

A variation amount EXV of the coupling coefficient generated when a positional deviation occurs in Embodiment 4 is expressed as (EX1−EX1L)+(EX1−EX1R) and a variation amount CNV of the coupling coefficient generated when a positional deviation occurs in Comparative Example 2 is expressed as (CN1−CN1L)+(CN1−CN1R). Here, the variation amount CNV is larger than the variation amount EXV.

That is, in the noncontact power transmission and reception system 100D of Embodiment 4, the central position C1 and the winding axis O1 are intended to accord with each other, while the winding axis O2 does not accord with the central position C1, but the winding axis O2 is placed at a position offset from the central position C1 toward a side closer to the first region R1 having a lower magnetic permeability and a lower electric resistance than the second region R2 (that is, a side away from the second region R2).

In the noncontact power transmission and reception system 100E of Comparative Example 2, the central position C1 and the winding axes O1, O2 are intended to accord with each other. As a whole of the noncontact power transmission and reception systems 100D, 100E, in terms of the second region R2, the existence of the space S is dominant both in Comparative Example 2 and Embodiment 4. Accordingly, an influence of the second region R2 to the noncontact power transmission and reception is hardly different between Comparative Example 2 and Embodiment 4. Meanwhile, in terms of the first region R1, an influence of reflection of the first region R1 to the noncontact power transmission and reception is larger in Comparative Example 2 than in Embodiment 4.

Accordingly, with the configuration of Embodiment 4, in a case where the regions (the first region R1 and the second region R2) having different magnetic permeabilities and different electric resistances are formed around the power reception apparatus 5, even if the power receiving coil 5L deviates from the power transmission coil 8L, the variation amount EXV is smaller than the variation amount CNV, so that it is possible to restrain the coupling coefficient from varying in comparison with Comparative Example 2, thereby making it possible to achieve noncontact charging efficiency with few variations with respect to the positional deviation.

Embodiment 5

Figure 25:
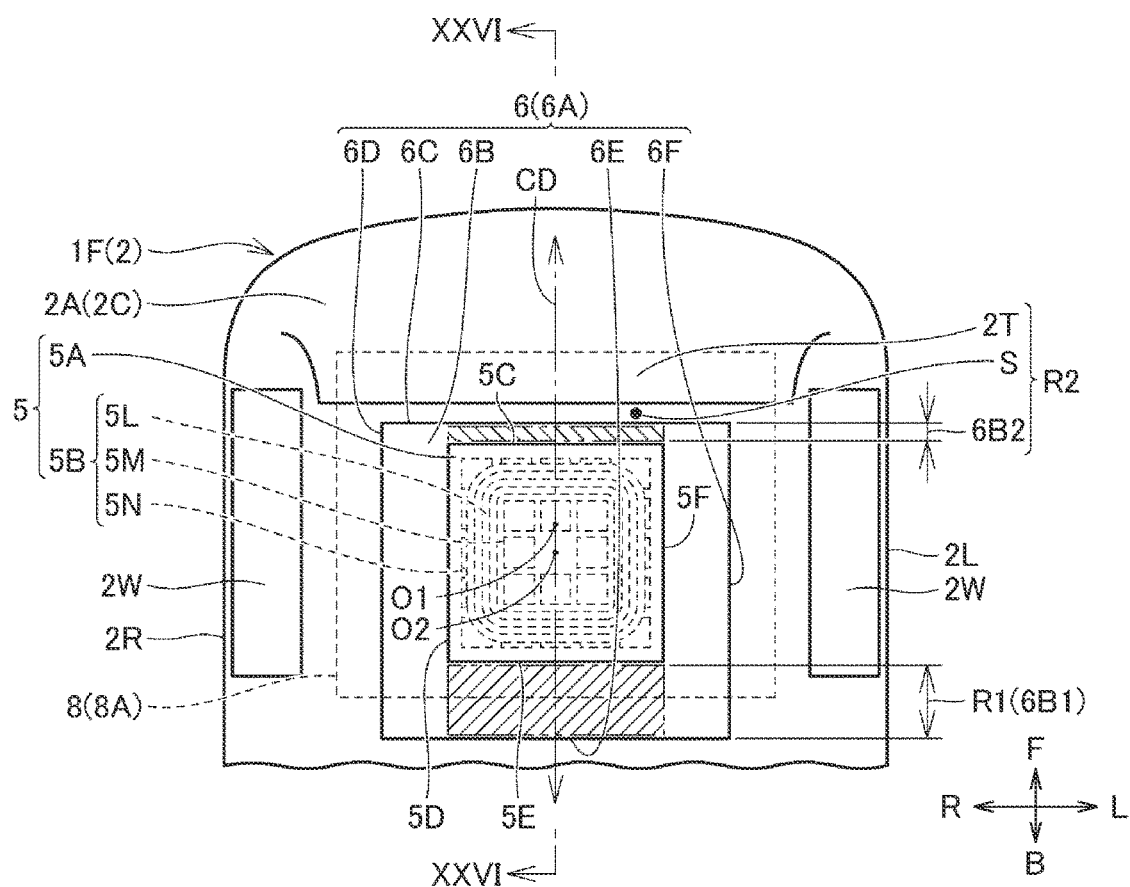
FIG. 25 is a plan view illustrating a floor panel 2A of a vehicle 1F (a vehicle body 2) in a noncontact power transmission and reception system 100F in Embodiment 5, and a power reception apparatus 5, a power storage apparatus 6, and the like, provided on a bottom surface 2C side of the floor panel 2A, and illustrates a state observed when the bottom surface 2C of the vehicle 1F is viewed from the lower side in the gravitational direction.
Figure 26:
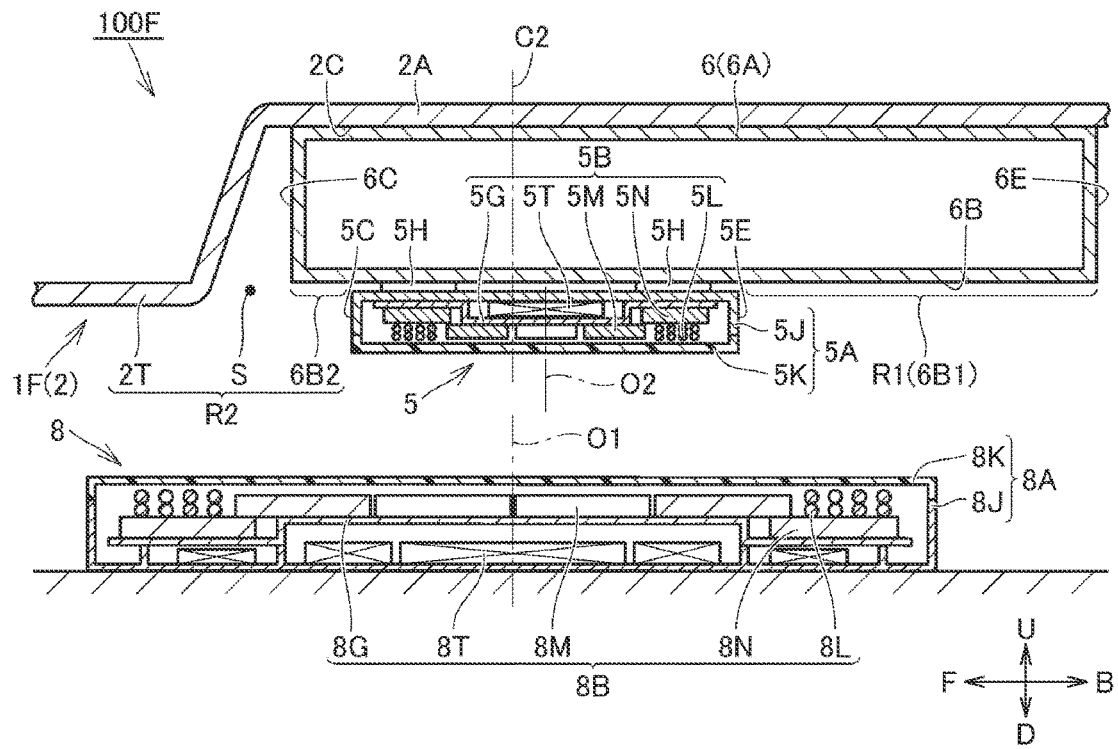
FIG. 26 is a sectional view taken along an arrow XXVI-XXVI in FIG. 25.

Referring now to FIGS. 25 to 29, the following describes a vehicle 1F and a noncontact power transmission and reception system 100F in Embodiment 5. FIG. 25 is a plan view illustrating a floor panel 2A of the vehicle 1F (a vehicle body 2) in the noncontact power transmission and reception system 100F, and a power reception apparatus 5, a power storage apparatus 6, and the like provided on a bottom surface 2C side of the floor panel 2A, and illustrates a state observed when the bottom surface 2C of the vehicle 1F is viewed from the lower side in the gravitational direction. FIG. 26 is a sectional view taken along an arrow XXVI-XXVI in FIG. 25. Embodiments 4 and 5 are different from each other in the following points.

The vehicle 1F is put into the parking space 9A (see FIG. 1), and aligned in the vehicle front-rear direction and in the vehicle width direction, by use of the shoe 9B (see FIG. 1), the mark lines LNR, LNL (see FIG. 3), and the like. In the noncontact power transmission and reception system 100F, noncontact power transmission and reception is performed between the power transmission apparatus 8 and a power reception apparatus 5 of the vehicle 1F.

In a state where the vehicle 1F is aligned in the parking space 9A (FIG. 1), a reference position C2 (FIG. 26) of the vehicle 1F and the winding axis O1 of the power transmission coil 8L accord with each other. The reference position C2 is a position near the power reception apparatus 5 and can be set to a given point in the vehicle front-rear direction. In Embodiment 5, the vehicle 1F is intended to be aligned in the parking space 9A (FIG. 1) so that the reference position C2 and the winding axis O1 accord with each other.

In the vehicle 1F of Embodiment 5, a winding axis O2 of a power receiving coil 5L is placed at a position deviating from the reference position C2 (FIG. 26) toward one side (an arrow B side) in a reference direction CD. The reference direction CD as used herein is a direction intersecting with the winding axis O2 of the power receiving coil 5L and parallel to the vehicle front-rear direction. A housing 5A of the power reception apparatus 5 is placed at a position offset to the arrow B side (a vehicle rear side) as a whole relative to the reference position C2.

A bottom surface 6B of the power storage apparatus 6 (a body case 6A) has exposed portions 6B1, 6B2. In Embodiment 5, the exposed portions 6B1, 6B2 are parts of the bottom surface 6B of the power storage apparatus 6 and are positioned so as to be adjacent to the housing 5A of the power reception apparatus 5 in the vehicle front-rear direction when the bottom surface 6B of the power storage apparatus 6 is planarly viewed from the lower side.

The exposed portion 6B1 is a part with hatching directed toward a right upper side in FIG. 25, and is positioned on the one side (the arrow B side) in the vehicle front-rear direction (the reference direction CD) relative to the housing 5A of the power reception apparatus 5. The exposed portion 6B2 is a part with hatching directed toward a right lower side in FIG. 25, and is positioned on the other side (an arrow F side) in the vehicle front-rear direction (the reference direction CD) relative to the housing 5A of the power reception apparatus 5. A width of the exposed portion 6B2 is narrower than a width of the exposed portion 6B1.

The exposed portion 6B1 of the power storage apparatus 6 (the bottom surface 6B of the body case 6A) constitutes a first region R1. The first region R1 is made of aluminum, or is formed so that a magnetic permeability and an electric resistance are lower than the magnetic permeability and the electric resistance of aluminum.

A space and/or a second region R2 formed so that a magnetic permeability and an electric resistance are higher than the magnetic permeability and the electric resistance of the first region R1 is provided at a position on the other side (the arrow F side) in the reference direction CD relative to the housing 5A of the power reception apparatus 5. In the present embodiment, a projection portion 2T is provided on a bottom surface 2C side of the vehicle body 2 (the floor panel 2A) so that the projection portion 2T is adjacent to the power reception apparatus 5 in the vehicle front-rear direction.

The projection portion 2T is constituted by a metal member mainly containing at least one of iron and stainless, for example. The projection portion 2T of the present embodiment is constituted by a member provided integrally with the floor panel 2A, as a part of the floor panel 2A. Alternatively, the projection portion 2T may be constituted by a structural member (a lower arm or a frame) other than the floor panel 2A in the vehicle body 2.

The second region R2 including such a projection portion 2T is positioned on the other side (the arrow F side) in the reference direction CD (see FIG. 25 and so on) relative to the housing 5A of the power reception apparatus 5, and is formed such that a magnetic permeability and an electric resistance thereof are higher than the magnetic permeability and the electric resistance of the first region R1, respectively.

Noncontact Power Transmission and Reception

Figure 27:
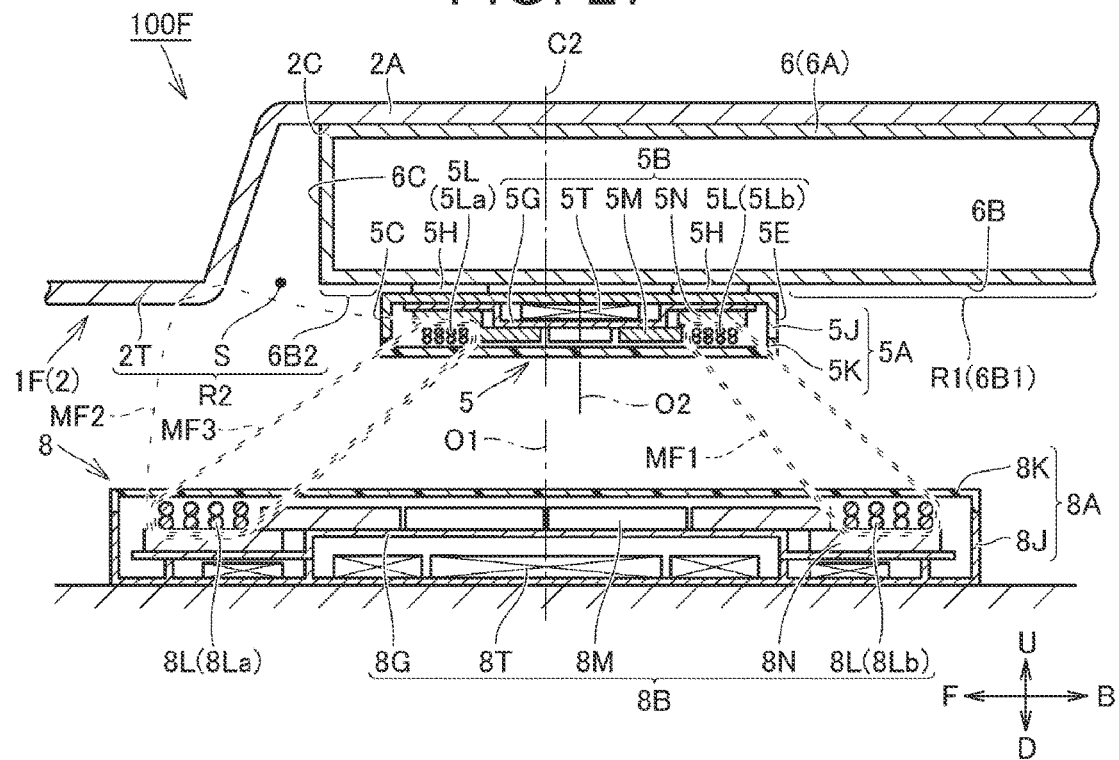
FIG. 27 is a sectional view illustrating a state where a power transmission apparatus 8 and a power reception apparatus 5 of the vehicle 1F perform power transmission and reception in a contactless manner in a state where the vehicle 1F in Embodiment 5 is aligned in the parking space.

In the noncontact power transmission and reception system 100F, noncontact power transmission and reception is performed between the power transmission apparatus 8 and the power reception apparatus 5 of the vehicle 1F. FIG. 27 is a sectional view illustrating a state where the power transmission apparatus 8 and the power reception apparatus 5 of the vehicle 1F perform power transmission and reception in a contactless manner in a state where the vehicle 1F is aligned in the parking space 9A (FIG. 1) (in other words, the reference position C2 of the vehicle 1F and the winding axis O1 of the power transmission coil 8L accord with each other).

Aligned State

As illustrated in FIG. 27, in Embodiment 5, in a state where the power reception apparatus 5 and the power transmission apparatus 8 are aligned to each other (in a state where the reference position C2 of the vehicle body 2 accords with the winding axis O1 of the power transmission coil 8L in the reference direction CD (FIG. 25)), the winding axis O2 of the power receiving coil 5L is placed at a position deviating from the reference position C2 of the vehicle body 2 toward the one side (the arrow F side) in the reference direction CD. That is, when the winding axis O1 of the power transmission coil 8L is extended upward to draw a virtual extension line (corresponding to a straight line extending in the up-down direction through the reference position C2) in a state where the vehicle body 2 is aligned in the parking space, the winding axis O2 of the power receiving coil 5L is placed at a position deviating toward the one side (the arrow F side) in the reference direction CD from a position of the extension line.

Magnetic fluxes MF1 formed around the power transmission coil 8L (8Lb) cross the power receiving coil 5L (5Lb). Magnetic fluxes MF3 formed around the power transmission coil 8L (8La) cross the power receiving coil 5L (5La). Magnetic fluxes MF2 formed around the power transmission coil 8L (8La) are guided toward the power receiving coil 5L (5La) due to the existence of a lower part of the projection portion 2T, so as to cross the power receiving coil 5L (5La).

Positional Deviation Toward Arrow L Side

Figure 28:
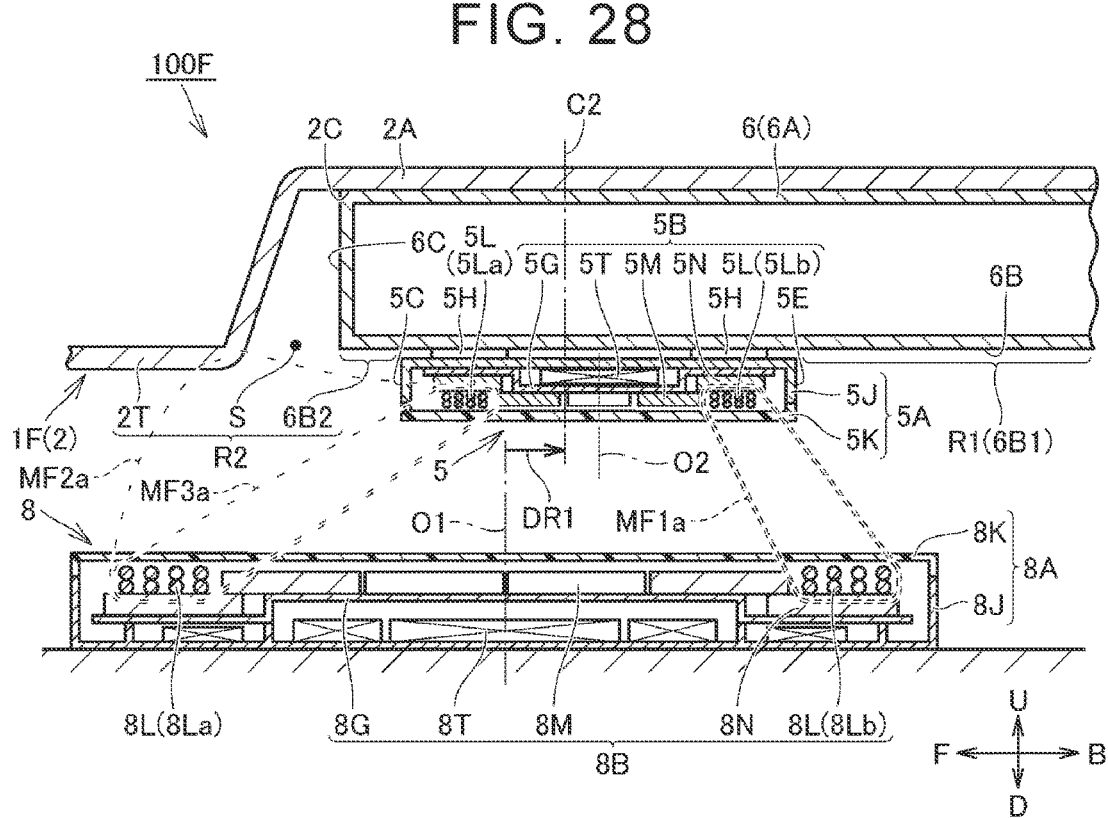
FIG. 28 is a sectional view illustrating a state where a power receiving coil 5L deviates from a power transmission coil 8L toward an arrow B side only by a distance DR1, from the state illustrated in FIG. 27.

FIG. 28 is a sectional view illustrating a state where the power receiving coil 5L deviates from the power transmission coil 8L toward the arrow B side only by a distance DR1, from the state illustrated in FIG. 27. The lower part of the projection portion 2T is positioned above the power transmission coil 8L (8La) (positioned inside the exterior shape of the coil portion 8La, in a plan view).

Among magnetic fluxes formed around the power transmission coil 8L (8Lb), an amount of magnetic fluxes reflected by the exposed portion 6B1 is decreased in comparison with the case of FIG. 27, and an amount of magnetic fluxes MF1a crossing the power receiving coil 5L (5Lb) is increased in comparison with the magnetic fluxes MF1 (FIG. 27). In the meantime, an amount of magnetic fluxes MF3a formed around the power transmission coil 8L (8La) and crossing the power receiving coil 5L (5La) is decreased in comparison with the magnetic fluxes MF3 (FIG. 27).

Some parts of magnetic fluxes MF2a formed around the power transmission coil 8L (8La) are guided by the projection portion 2T so as to cross the power receiving coil 5L (5La). As a whole of the noncontact power transmission and reception system 100F, the amount of the magnetic fluxes MF3a is decreased in comparison with the magnetic fluxes MF3 (FIG. 27). However, the amount of the magnetic fluxes MF1a is increased in comparison with the magnetic fluxes MF1 (FIG. 27), and the magnetic fluxes MF2a that can cross the power receiving coil 5L (5La) exist, so that a coupling coefficient in the case of FIG. 28 is restrained from being greatly decreased from a coupling coefficient in the case of FIG. 27.

Positional Deviation Toward Arrow R Side

Figure 29:
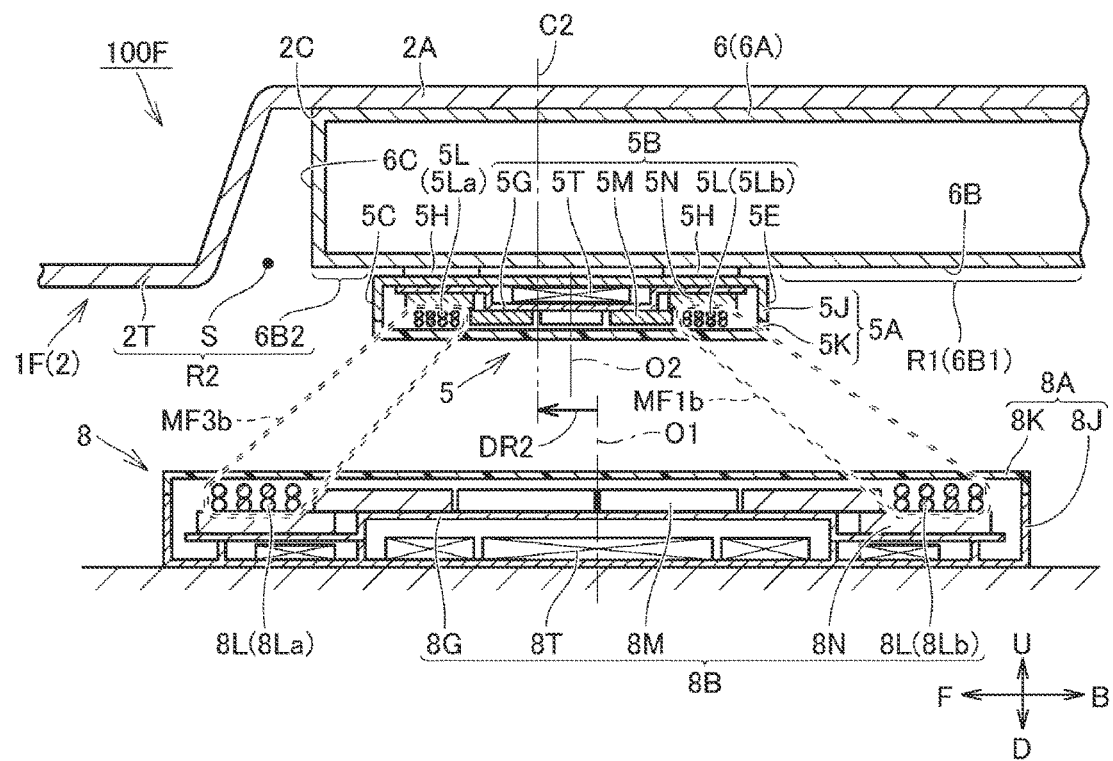
FIG. 29 is a sectional view illustrating a state where the power receiving coil 5L deviates from the power transmission coil 8L toward an arrow F side only by a distance DR2, from the state illustrated in FIG. 27.

FIG. 29 is a sectional view illustrating a state where the power receiving coil 5L deviates from the power transmission coil 8L toward the arrow F side only by a distance DR2, from the state illustrated in FIG. 27. The distance DR2 is generally the same as the distance DR1 (FIG. 28). Most of the lower part of the projection portion 2T is not positioned above the power transmission coil 8L (8La), but is positioned outside the exterior shape of the coil portion 8La, in a plan view.

Among magnetic fluxes formed around the power transmission coil 8L (8Lb), an amount of magnetic fluxes reflected by the exposed portion 6B1 is increased in comparison with the case of FIG. 27, and an amount of magnetic fluxes MF1b crossing the power receiving coil 5L (5Lb) is decreased in comparison with the magnetic fluxes MF1 (FIG. 27). In the meantime, an amount of magnetic fluxes MF3b formed around the power transmission coil 8L (8La) and crossing the power receiving coil 5L (5La) is increased in comparison with the magnetic fluxes MF3 (FIG. 27).

The magnetic fluxes formed around the power transmission coil 8L (8La) are hardly guided to the projection portion 2T. As a whole of the noncontact power transmission and reception system 100F, the amount of the magnetic fluxes MF1b is decreased in comparison with the magnetic fluxes MF1 (FIG. 27), and a guiding effect by the projection portion 2T is hardly obtained. However, the amount of the magnetic fluxes MF3b is increased in comparison with the magnetic fluxes MF3 (FIG. 27), so that a coupling coefficient in the case of FIG. 29 is restrained from being greatly decreased from the coupling coefficient in the case of FIG. 27.

In the present embodiment, as described above, the regions (the first region R1 and the second region R2) having different magnetic permeabilities and different electric resistances are formed around the power reception apparatus 5, and in a state where the power reception apparatus 5 and the power transmission apparatus 8 are aligned to each other (in a state where the reference position C2 of the vehicle body 2 accords with the winding axis O1 of the power transmission coil 8L in the reference direction CD (FIG. 25)), the winding axis O2 of the power receiving coil 5L is placed at a position deviating from the reference position C2 of the vehicle body 2 (and the winding axis O1) toward the one side (the arrow B side) in the reference direction CD.

With the above configuration, due to a principle similar to the principle described in Embodiment 1, even if the power receiving coil 5L deviates from the power transmission coil 8L toward the arrow B side (FIG. 28), or even if the power receiving coil 5L deviates from the power transmission coil 8L toward the arrow F side (FIG. 29), it is possible to restrain variations in the coupling coefficient between the power receiving coil 5L and the power transmission coil 8L.

Embodiment 6

Figure 30:
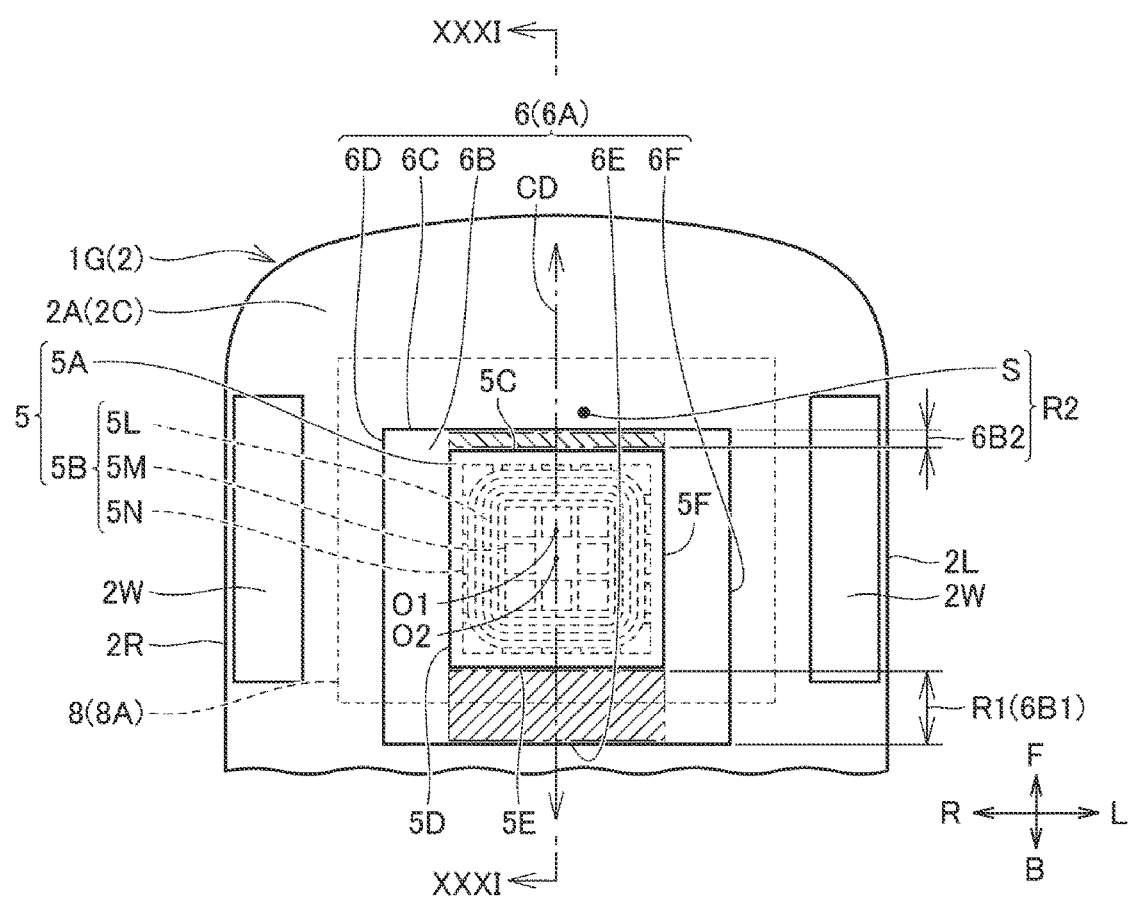
FIG. 30 is a plan view illustrating a floor panel 2A of a vehicle 1G (a vehicle body 2) in a noncontact power transmission and reception system 100G in Embodiment 6, and a power reception apparatus 5, a power storage apparatus 6, and the like provided on a bottom surface 2C side of the floor panel 2A, and illustrates a state observed when the bottom surface 2C of the vehicle 1G is viewed from the lower side in the gravitational direction.
Figure 31:
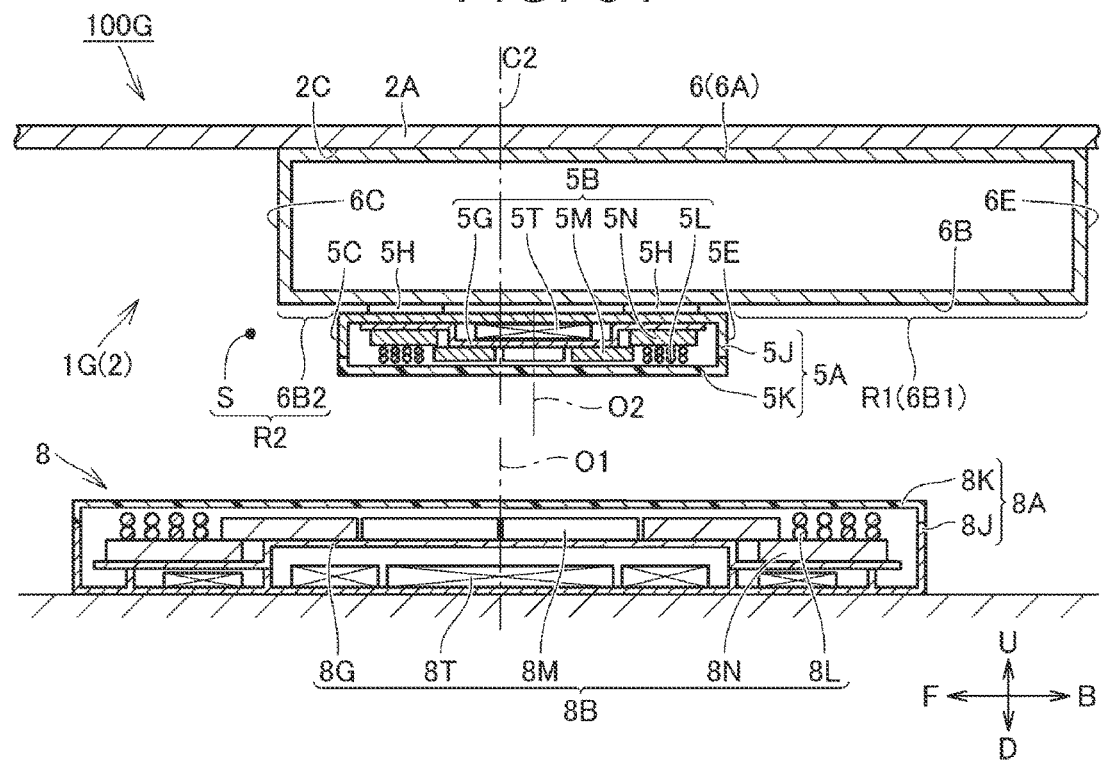
FIG. 31 is a sectional view taken along an arrow XXXI-XXXI in FIG. 30.

Referring now to FIGS. 30 to 34, the following describes a vehicle 1G and a noncontact power transmission and reception system 100G in Embodiment 6. FIG. 30 is a plan view illustrating a floor panel 2A of the vehicle 1G (a vehicle body 2) in the noncontact power transmission and reception system 100G, and a power reception apparatus 5, a power storage apparatus 6, and the like provided on a bottom surface 2C side of the floor panel 2A, and illustrates a state observed when the bottom surface 2C of the vehicle 1G is viewed from the lower side in the gravitational direction. FIG. 31 is a sectional view taken along an arrow XXXI-XXXI in FIG. 30. Embodiments 5 and 6 are different from each other in the following points.

The vehicle 1G of Embodiment 6 does not include the projection portion 2T (Embodiment 5). A space S is provided on the arrow F side relative to a front wall 5C of the power reception apparatus 5 and on the arrow F side relative to a front wall 6C of the power storage apparatus 6. A second region R2 includes the space S and an exposed portion 6B2, but does not include the projection portion 2T (Embodiment 5) as a constituent. The space S and the exposed portion 6B2 constituting the second region R2 is, as a whole, positioned on the other side (the arrow F side) in the reference direction CD relative to a housing 5A of the power reception apparatus 5, and is formed such that a magnetic permeability and an electric resistance thereof are higher than a magnetic permeability and an electric resistance of a first region R1, respectively.

Noncontact Power Transmission and Reception

Figure 32:
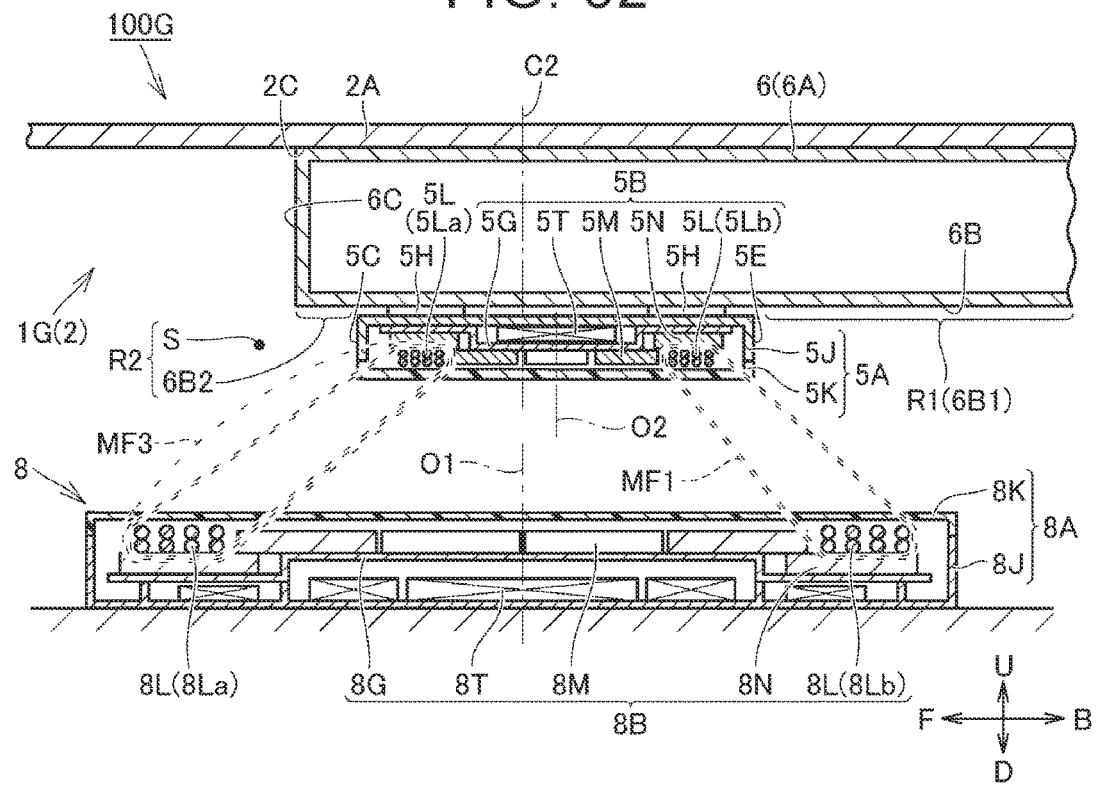
FIG. 32 is a sectional view illustrating a state where a power transmission apparatus 8 and a power reception apparatus 5 of the vehicle 1G perform power transmission and reception in a contactless manner in a state where the vehicle 1G in Embodiment 6 is aligned in the parking space.

In the noncontact power transmission and reception system 100G, noncontact power transmission and reception is performed between the power transmission apparatus 8 and the power reception apparatus 5 of the vehicle 1G. FIG. 32 is a sectional view illustrating a state where the power transmission apparatus 8 and the power reception apparatus 5 of the vehicle 1G perform power transmission and reception in a contactless manner in a state where the vehicle 1G is aligned in the parking space 9A (see FIG. 1 and so on) (in other words, a reference position C2 of the vehicle 1G and the winding axis O1 of the power transmission coil 8L accord with each other).

Aligned State

As illustrated in FIG. 32, in the present embodiment, in a state where the power reception apparatus 5 and the power transmission apparatus 8 are aligned to each other (in a state where the reference position C2 of the vehicle body 2 accords with the winding axis O1 of the power transmission coil 8L in the reference direction CD (FIG. 30)), the winding axis O2 of the power receiving coil 5L is placed at a position deviating from the reference position C2 of the vehicle body 2 toward the one side (the arrow B side) in the reference direction CD.

Magnetic fluxes MF1 formed around the power transmission coil 8L (8Lb) cross the power receiving coil 5L (5Lb), similarly to Embodiment 5. Magnetic fluxes MF3 formed around the power transmission coil 8L (8La) pass through the space S and cross the power receiving coil 5L (5La) without being affected by the projection portion 2T, unlike Embodiment 5.

Positional Deviation Toward Arrow L Side

Figure 33:
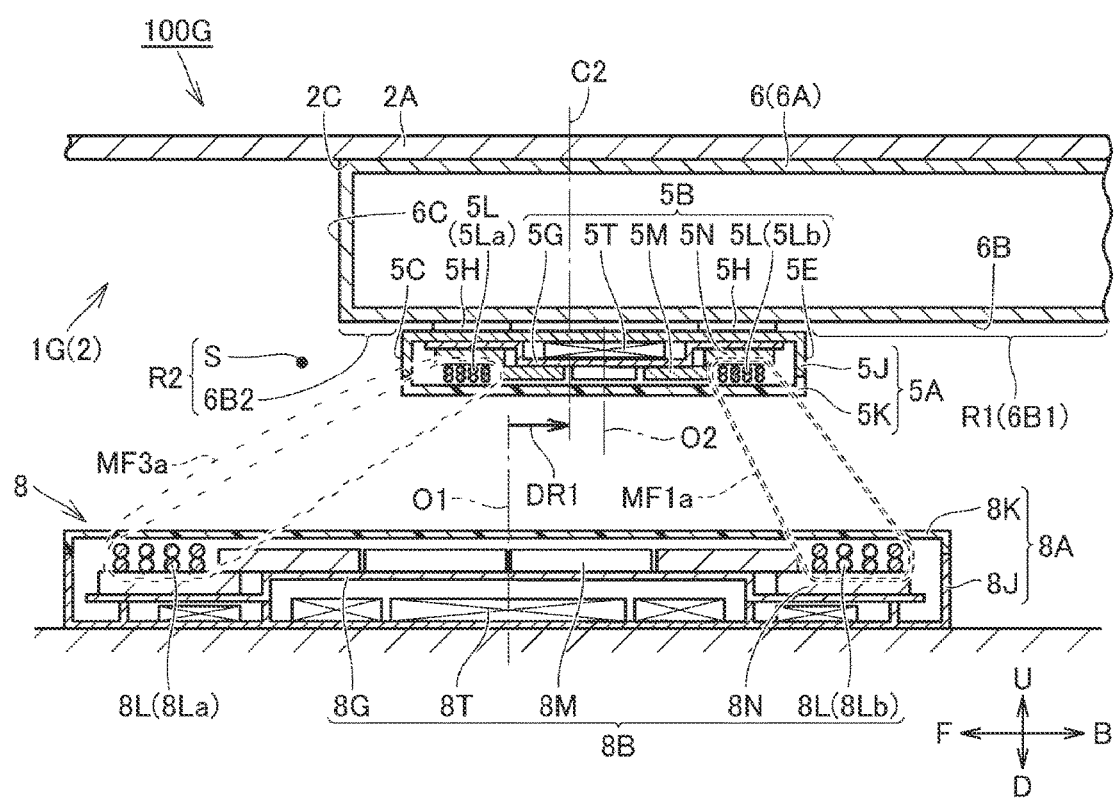
FIG. 33 is a sectional view illustrating a state where a power receiving coil 5L deviates from a power transmission coil 8L toward the arrow B side only by a distance DR1, from the state illustrated in FIG. 32.

FIG. 33 is a sectional view illustrating a state where the power receiving coil 5L deviates from the power transmission coil 8L toward the arrow B side only by a distance DR1, from the state illustrated in FIG. 32. Among magnetic fluxes formed around the power transmission coil 8L (8Lb), an amount of magnetic fluxes reflected by the exposed portion 6B1 is decreased in comparison with the case of FIG. 32, and an amount of magnetic fluxes MF1a crossing the power receiving coil 5L (5Lb) is increased in comparison with the magnetic fluxes MF1 (FIG. 32). In the meantime, an amount of magnetic fluxes MF3a formed around the power transmission coil 8L (8La) and crossing the power receiving coil 5L (5La) is decreased in comparison with the magnetic fluxes MF3 (FIG. 32).

Positional Deviation Toward Arrow R Side

Figure 34:
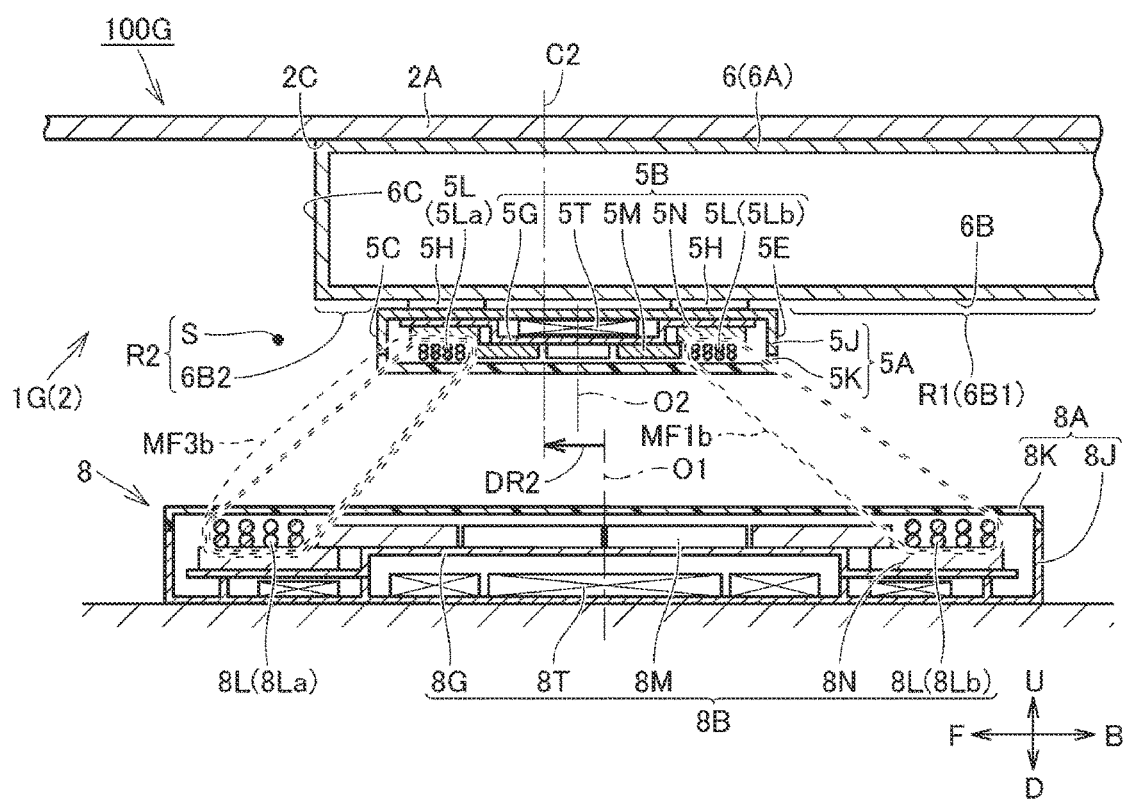
FIG. 34 is a sectional view illustrating a state where the power receiving coil 5L deviates from the power transmission coil 8L toward the arrow F side only by a distance DR2, from the state illustrated in FIG. 32.

FIG. 34 is a sectional view illustrating a state where the power receiving coil 5L deviates from the power transmission coil 8L toward the arrow F side only by a distance DR2, from the state illustrated in FIG. 32. The distance DR2 is generally the same as the distance DR1 (FIG. 33). The space S is placed above the power transmission coil 8L (8La).

Among magnetic fluxes formed around the power transmission coil 8L (8Lb), an amount of magnetic fluxes reflected by the exposed portion 6B1 is increased in comparison with the case of FIG. 32, and an amount of magnetic fluxes MF1b crossing the power receiving coil 5L (5Lb) is decreased in comparison with the magnetic fluxes MF1 (FIG. 32). In the meantime, an amount of magnetic fluxes MF3b formed around the power transmission coil 8L (8La) and crossing the power receiving coil 5L (5La) is increased in comparison with the magnetic fluxes MF3 (FIG. 32).

In the present embodiment, as described above, the regions (the first region R1 and the second region R2) having different magnetic permeabilities and different electric resistances are formed around the power reception apparatus 5, and in a state where the power reception apparatus 5 and the power transmission apparatus 8 are aligned to each other (in a state where the reference position C2 of the vehicle body 2 accords with the winding axis O1 of the power transmission coil 8L in the reference direction CD (FIG. 30)), the winding axis O2 of the power receiving coil 5L is placed at a position deviating from the reference position C2 of the vehicle body 2 (and the winding axis O1) toward the one side (the arrow B side) in the reference direction CD.

With the above configuration, due to a principle similar to the principle described in Embodiment 4, even if the power receiving coil 5L deviates from the power transmission coil 8L toward the arrow B side (FIG. 33), or even if the power receiving coil 5L deviates from the power transmission coil 8L toward the arrow F side (FIG. 34), it is possible to restrain variations in the coupling coefficient between the power receiving coil 5L and the power transmission coil 8L.

Embodiments have been described as above, but contents described herein are just examples in all respects and are not limitative. A technical scope of the present disclosure is shown by Claims and intended to include all modifications made within the meaning and scope equivalent to Claims.

The disclosure is industrially applicable to a vehicle capable of receiving an electric power in a contactless manner from a power transmission apparatus provided outside a vehicle body.

What is claimed is:

1. A vehicle capable of receiving an electric power from a power transmission apparatus in a contactless manner, the power transmission apparatus being placed such that a winding axis of a power transmission coil extends in an up-down direction at a central position of a parking space in a width direction, the vehicle comprising:

a vehicle body having a bottom surface; and a power reception apparatus including a power receiving coil configured to receive an electric power from the power transmission coil of the power transmission apparatus in a contactless manner, and a housing in which the power receiving coil is accommodated, the power reception apparatus being provided on a bottom surface side of the vehicle body so that a winding axis of the power receiving coil extends in the up-down direction, wherein when a direction intersecting with the winding axis of the power receiving coil and parallel to a vehicle width direction is assumed a reference direction, a first region made of aluminum or formed so that a magnetic permeability and an electric resistance of the first region are lower than a magnetic permeability and an electric resistance of aluminum, respectively, is provided at a position on one side in the reference direction relative to the housing of the power reception apparatus;

a space and/or a second region formed so that a magnetic permeability and an electric resistance of the second region are higher than the magnetic permeability and the electric resistance of the first region, respectively, is provided at a position on the other side in the reference direction relative to the housing of the power reception apparatus; and the winding axis of the power receiving coil is placed at a position deviating toward the one side in the reference direction from a central position of the vehicle body in the vehicle width direction.

2. The vehicle according to claim 1, further comprising a power storage apparatus including a body case, the body case being placed on the bottom surface of the vehicle body, wherein:

the housing of the power reception apparatus is attached to a bottom surface of the body case; and the bottom surface of the body case of the power storage apparatus has a part constituting the first region.

3. The vehicle according to claim 1, further comprising:

an engine placed inside the vehicle body; and a muffler connected to the engine and provided on the bottom surface side of the vehicle body, wherein the muffler has a part constituting the second region.

4. A noncontact power transmission and reception system comprising:

a power transmission apparatus including a power transmission coil and placed such that a winding axis of the power transmission coil extends in an up-down direction in a parking space; and a vehicle capable of receiving an electric power from the power transmission apparatus in a contactless manner in a state where the vehicle is aligned in the parking space, the vehicle including a vehicle body having a bottom surface, and a power reception apparatus including a power receiving coil configured to receive an electric power from the power transmission coil of the power transmission apparatus in a contactless manner, and a housing in which the power receiving coil is accommodated, the power reception apparatus being provided on the bottom surface of the vehicle body so that a winding axis of the power receiving coil extends in the up-down direction, Wherein:

when a direction intersecting with the winding axis of the power receiving coil and parallel to a vehicle front-rear direction or a vehicle width direction is assumed a reference direction, a first region made of aluminum or formed so that a magnetic permeability and an electric resistance of the first region are lower than a magnetic permeability and an electric resistance of aluminum, respectively, is provided at a position on one side in the reference direction relative to the housing of the power reception apparatus;

a space and/or a second region formed so that a magnetic permeability and an electric resistance of the second region are higher than the magnetic permeability and the electric resistance of the first region, respectively, is provided at a position on the other side in the reference direction relative to the housing of the power reception apparatus; and when the winding axis of the power transmission coil is extended upward to draw a virtual extension line in a state where the vehicle body is aligned in the parking space, the winding axis of the power receiving coil is placed at a position deviating toward the one side in the reference direction from a position of the extension line.

* * * * *